(12) United States Patent
Marsh, Jr.

(10) Patent No.: US 12,486,583 B2
(45) Date of Patent: Dec. 2, 2025

(54) HYDROGEN GENERATION SYSTEM AND REGULATOR THEREFOR

(71) Applicant: Green Fuel, LLC, Wetumpka, AL (US)

(72) Inventor: Gordon J. Marsh, Jr., Wetumpka, AL (US)

(73) Assignee: Green Fuel, LLC, Wetumpka, AL (US)

( * ) Notice: Subject to any disclaimer, the term of this patent is extended or adjusted under 35 U.S.C. 154(b) by 0 days.

(21) Appl. No.: 19/194,801

(22) Filed: Apr. 30, 2025

(65) Prior Publication Data

US 2025/0336995 A1    Oct. 30, 2025

Related U.S. Application Data

(60) Provisional application No. 63/646,602, filed on May 13, 2024, provisional application No. 63/640,677, filed on Apr. 30, 2024.

(51) Int. Cl.
*C25B 1/04* (2021.01)
*C25B 9/19* (2021.01)
(Continued)

(52) U.S. Cl.
CPC .......... *H01M 8/04783* (2013.01); *C25B 1/04* (2013.01); *C25B 9/19* (2021.01); *C25B 9/60* (2021.01); *C25B 9/70* (2021.01); *G05D 16/028* (2019.01); *G05D 16/065* (2013.01); *H01M 8/04156* (2013.01); *H01M 8/04201* (2013.01); *H01M 2008/1095* (2013.01)

(58) Field of Classification Search
CPC ......... H01M 8/04783; H01M 8/04156; H01M 8/04201; H01M 2008/1095; G05D 16/028; G05D 16/065; C25B 1/04; C25B 9/19; C25B 9/60; C25B 15/08; C25B 9/23; C25B 9/70; C25B 15/083
See application file for complete search history.

(56) References Cited

U.S. PATENT DOCUMENTS 3,106,494 A * 10/1963 Thorsheim ........ H01M 8/04104
137/98
3,216,441 A * 11/1965 Thorsheim ......... G05D 16/0619
137/595

(Continued)

*Primary Examiner* — Marina A Tietjen
(74) *Attorney, Agent, or Firm* — WARNER NORCROSS + JUDD LLP

(57) ABSTRACT

A passive dual modulating regulator with relative differential venting ("regulator") for use with a contained hydrogen generation system ("system") comprises a flexible diaphragm clamped between a first housing section and a second housing section. The regulator defines a hydrogen fluid path in fluid communication with the hydrogen-side of the system, an exterior hydrogen storage vessel, and an exterior of the system. The regulator also defines an oxygen fluid path in fluid communication with the oxygen-side of the system, an exterior oxygen storage vessel, and an exterior of the system. The regulator regulates pressure imbalances between the oxygen-side of the system and the hydrogen-side of the system, and vents oxygen and hydrogen to an exterior of the system to allow collection of both hydrogen and oxygen and avoid rupture of a proton-exchange membrane of the system.

14 Claims, 27 Drawing Sheets

(51) Int. Cl.
  *C25B 9/60* (2021.01)
  *C25B 9/70* (2021.01)
  *G05D 16/00* (2006.01)
  *G05D 16/06* (2006.01)
  *H01M 8/04082* (2016.01)
  *H01M 8/04119* (2016.01)
  *H01M 8/04746* (2016.01)
  *H01M 8/10* (2016.01)

(56) References Cited

U.S. PATENT DOCUMENTS

| | | | |
|---|---|---|---|
| 5,507,309 A * | 4/1996 | Dean | G05D 16/0658 |
| | | | 137/87.03 |
| 7,048,839 B2 * | 5/2006 | Harada | C25B 9/05 |
| | | | 204/266 |
| 11,500,401 B1 * | 11/2022 | Marsh, Jr. | C25B 9/70 |

* cited by examiner

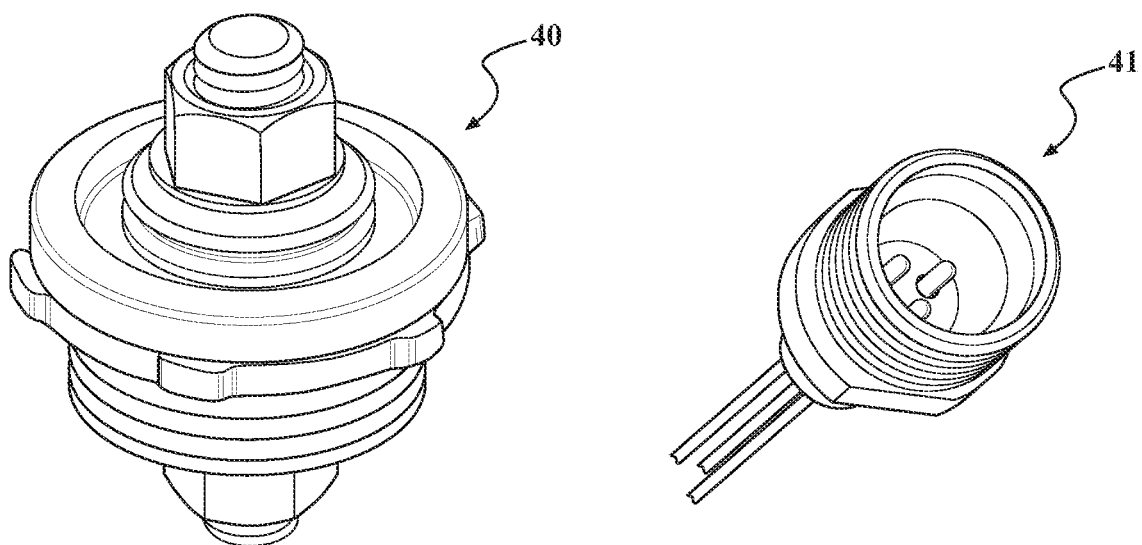
FIG. 6A  FIG. 6B
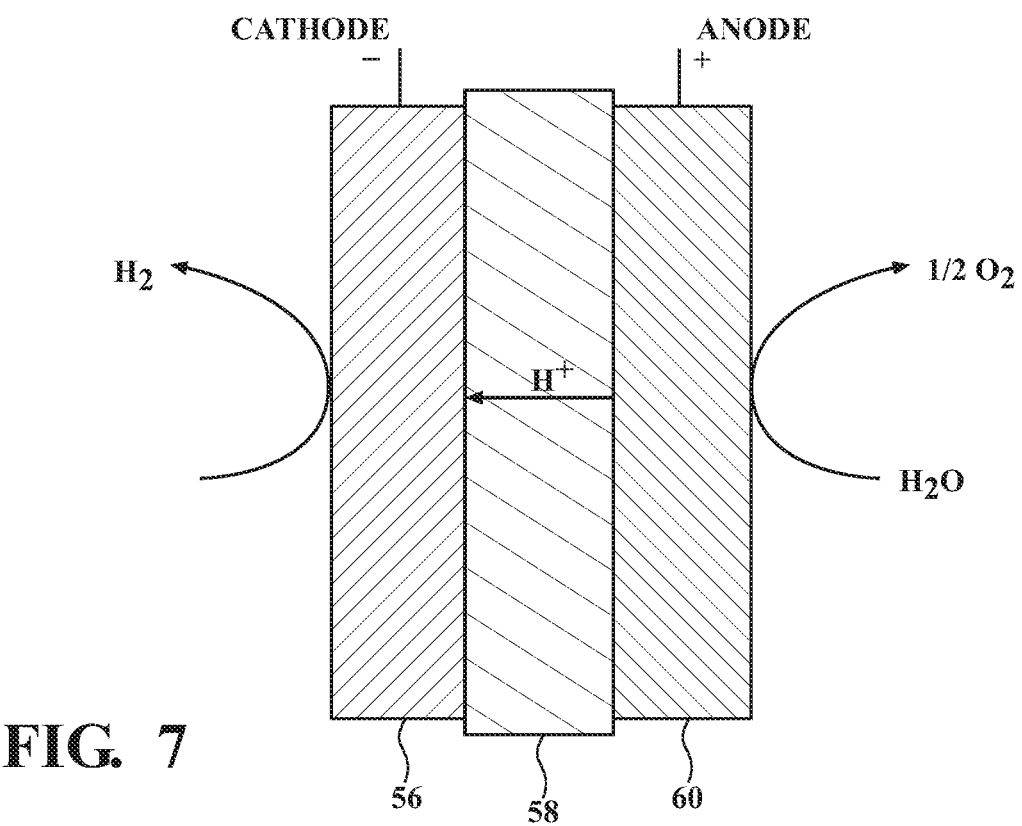
FIG. 7

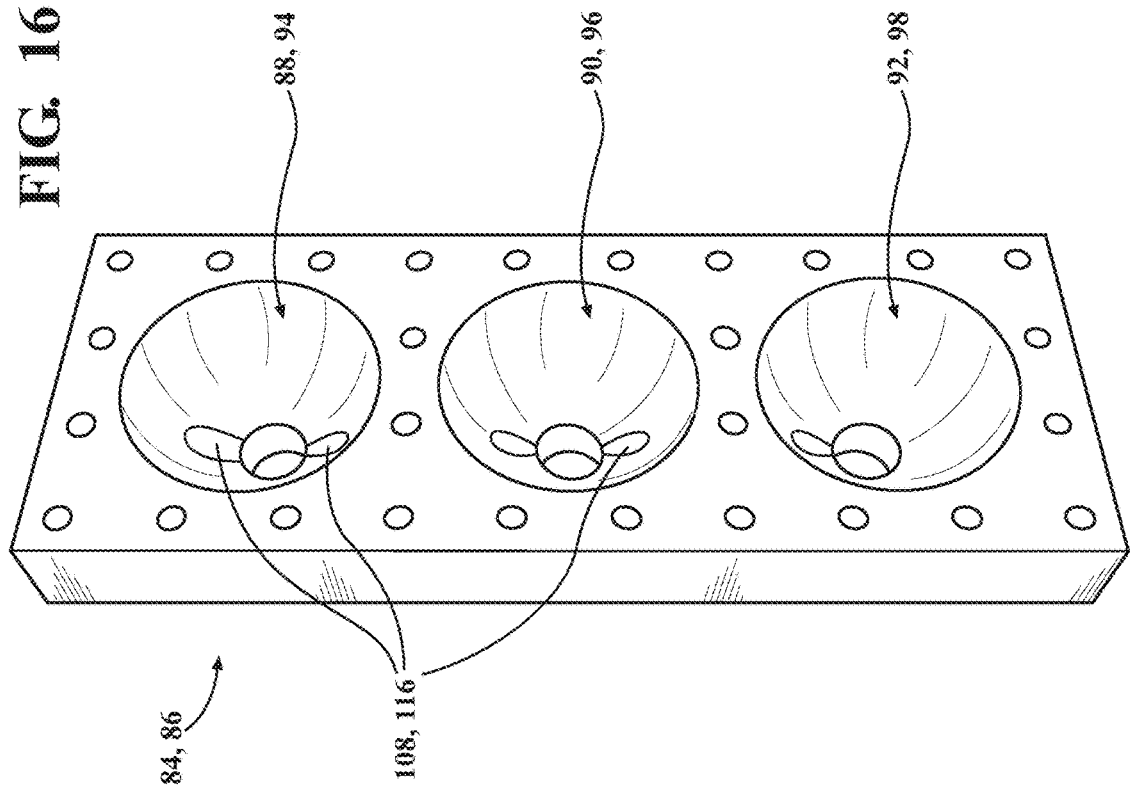
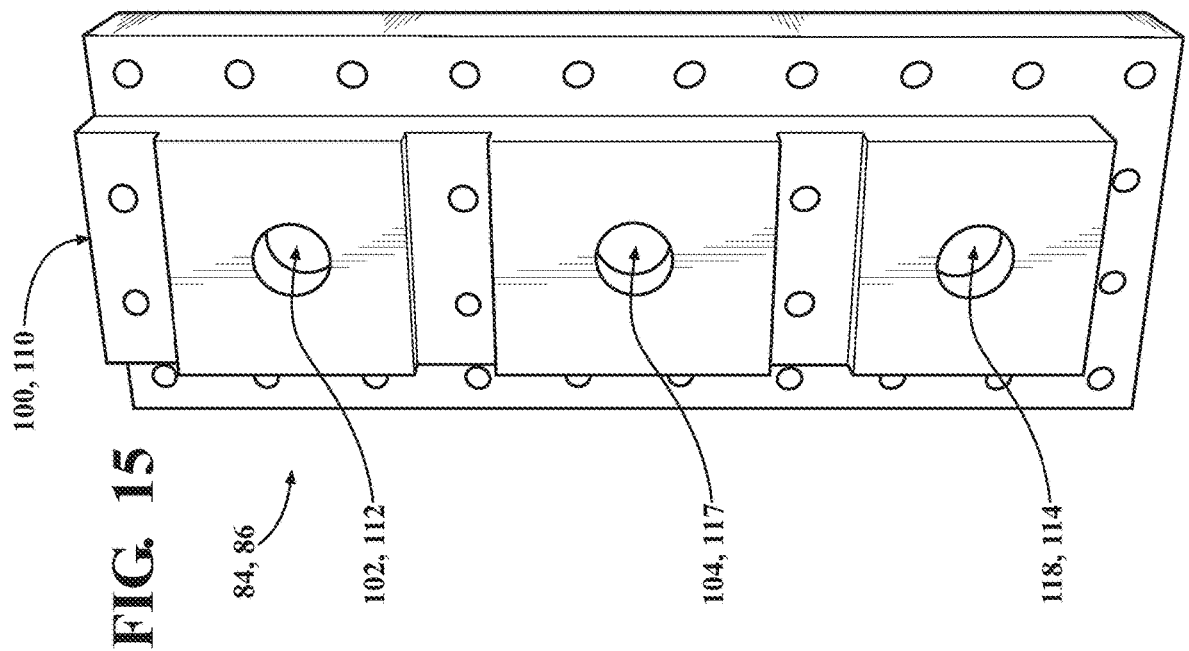

FIG. 30B

Regulate a hydrogen discharge rate and an oxygen discharge rate to prevent pressure imbalances between the oxygen-side of the hydrogen generation system and the hydrogen plenum to avoid rupture of PEM cells within the PEM cell stack
3016

Discharge hydrogen from the regulator to an exterior hydrogen storage vessel
3018

Discharge oxygen from the regulator to an exterior oxygen storage vessel.
3020

Regulate a hydrogen discharge rate and an oxygen discharge rate to prevent pressure imbalances between an oxygen-side of the hydrogen generation system and the hydrogen plenum to avoid rupture of PEM cells within the PEM cell stack
3216

↓

Discharge hydrogen from the regulator to an exterior hydrogen storage vessel
3218

↓

Discharge oxygen from the regulator to an exterior oxygen storage vessel
3220

↓

Use oxygen from the exterior oxygen storage vessel to power a water booster to inject deionized water into the oxygen-water separator, wherein the water booster converts potential energy stored in the oxygen produced by the system and stored in the exterior oxygen storage vessel into mechanical energy to inject water into the oxygen-water separator
3222

↓

Use oxygen from the exterior oxygen storage vessel to power a gas booster to supply a higher-pressure secondary storage tank such as a vehicle hydrogen tank with hydrogen from the exterior hydrogen storage vessel, wherein the gas booster converts potential energy stored in the oxygen produced by the system and stored in the exterior oxygen storage vessel into mechanical energy to move hydrogen stored in the exterior hydrogen storage vessel into the secondary storage tank.
3224

FIG. 32B

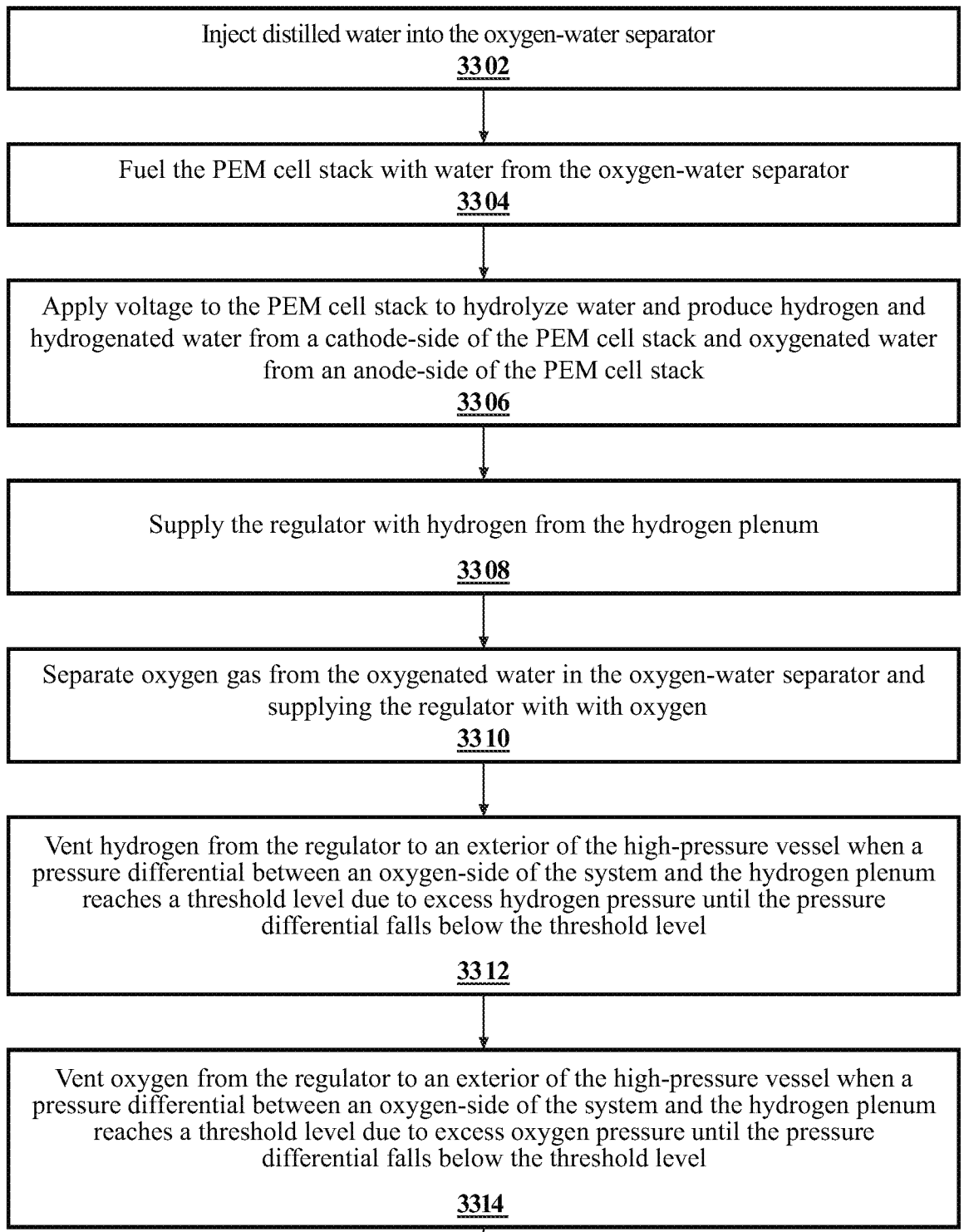

FIG. 33A

```
Regulate a hydrogen discharge rate and an oxygen discharge rate to prevent pressure
inbalances between an oxygen-side of the hydrogen generation system and the
hydrogen plenum to avoid rupture of PEM cells within the PEM cell stack
3316
```

```
Discharge hydrogen from the regulator to an exterior hydrogen storage vessel
3318
```

```
Discharge oxygen from the regulator to an exterior oxygen storage vessel
3320
```

```
Use hydrogen from the exterior hydrogen storage vessel to supply a methanol reactor
that reacts carbon dioxide from air and the hydrogen in the pressure of a catalyst to
produce methanol
3322
```

```
Power the methanol reactor with at least one of the oxygen from the exterior oxygen
storage vessel, hydrogen from the exterior hydrogen storage vessel, and solar energy.
3324
```

FIG. 33B

HYDROGEN GENERATION SYSTEM AND REGULATOR THEREFOR

CROSS-REFERENCE TO RELATED APPLICATIONS

This application claims priority to and all advantages of U.S. Provisional Application No. 63/640,677 filed on Apr. 30, 2024, and U.S. Provisional Application No. 63/646,602 filed on May 13, 2024, the contents of which are incorporated herein by reference.

FIELD OF THE DISCLOSURE

The present disclosure relates to systems and methods for water electrolysis for the generation of hydrogen and oxygen using proton-exchange membrane cells or cell stacks.

BACKGROUND OF THE DISCLOSURE

Proton-exchange membrane ("PEM") electrolyzers are used as an ionic conductor during the generation of hydrogen via hydrolysis. The PEM consists of a thin, solid ion-conducting membrane. The PEM transfers the H+ ion (i.e., proton) from an anode to a cathode and separates hydrogen and oxygen gases. Although hydrolysis is endothermic, the conversion of liquid water to hydrogen gas and oxygen gas during hydrolysis creates significant pressure increases and current processes fail to capture the energy of the hydrogen and oxygen gas produced.

PEM electrolyzers include differential pressure designs and balanced pressure designs. In either differential or balanced pressure designs, pressure regulation of hydrogen and oxygen gases is extremely important to the efficiency and life of the PEM electrolyzer. To preserve PEM cells, pressure imbalances between the hydrogen-side and the oxygen-side of the hydrogen generation system should be avoided to prevent factures in the PEM membranes due to disruptions in the hydrogen and oxygen output streams.

Accordingly, there remains a continued need for improved, efficient PEM processes, efficient processes that capture and use the energy created by the decomposition of water and the release of hydrogen and oxygen gas. There also remains a need for an improved pressure regulator for PEM electrolyzers that is practical and can quickly and efficiently eliminate pressure imbalances between the hydrogen-side and the oxygen-side of the hydrogen generation system and adapt to prevent disruptions in the hydrogen and oxygen output streams.

SUMMARY OF THE DISCLOSURE

A contained hydrogen generation system ("system") is disclosed and comprises a high-pressure containment vessel, one or more proton-exchange membrane ("PEM") cells, an oxygen-water separator, and a passive dual regulator with relative differential venting ("regulator"). The vessel defines a hydrogen plenum. The PEM and the oxygen-water separator are disposed in the hydrogen plenum. The regulator includes a hydrogen fluid path in fluid communication with the hydrogen plenum, an exterior hydrogen storage vessel, and an exterior of the vessel, and also includes an oxygen fluid path in fluid communication with the oxygen-water separator, an exterior oxygen storage vessel, and an exterior of the vessel. The regulator regulates pressure imbalances between an oxygen-side of the system and a hydrogen-side of the system, and vents oxygen and hydrogen to an exterior of the vessel to allow collection of both hydrogen and oxygen and avoid rupture of the PEM. The regulator responds to a pressure differential between a hydrogen-side and an oxygen-side of a PEM cell in the system. The regulator (1) vents hydrogen to an exterior of a high-pressure containment vessel of a contained hydrogen generating system when a pressure differential between an oxygen-side of the system and a hydrogen plenum reaches a threshold level due to excess hydrogen pressure until the pressure differential falls below the threshold level; (2) vents oxygen to an exterior of the high-pressure containment vessel when a pressure differential between the oxygen-side of the system and the hydrogen plenum reaches a threshold level due to excess oxygen pressure until the pressure differential falls below the threshold level; and (3) regulates a hydrogen discharge rate and an oxygen discharge rate to prevent pressure imbalances between an oxygen-side of the hydrogen generation system and the hydrogen plenum to avoid rupture of PEM cells within a PEM cell stack.

In one embodiment, the regulator includes a flexible diaphragm clamped between a first housing section and a second housing section. The regulator defines a hydrogen fluid path in fluid communication with the hydrogen-side of the system, an exterior hydrogen storage vessel, and an exterior of the system. The regulator also defines an oxygen fluid path in fluid communication with the oxygen-side of the system, an exterior oxygen storage vessel, and an exterior of the system. The regulator regulates pressure imbalances between the oxygen-side of the system and the hydrogen-side of the system, and vents oxygen and hydrogen to an exterior of the system to allow collection of both hydrogen and oxygen and avoid rupture of one or more PEM cells of the system.

In one embodiment, the regulator includes a flexible diaphragm that extends through three cavities. A first valve assembly in a first internal cavity extends through the flexible diaphragm and includes opposing valve pins for selectively closing hydrogen and oxygen outlet ports to balance pressure between the hydrogen-side and the oxygen-side of the system. A second valve assembly in a second internal cavity extends through the flexible diaphragm and includes a valve pin opposite a biasing element to vent the hydrogen-side of the system when a threshold pressure differential is exceeded. A third valve assembly in a third internal cavity extends through the flexible diaphragm and includes a valve pin opposite a biasing element to vent the oxygen-side of the system when the threshold pressure differential is exceeded.

Hydrogen generation systems that collect both hydrogen and oxygen generated during PEM electrolysis must balance pressures on the hydrogen-side and the oxygen-side of the PEM cell(s), as such the regulator is required. Further, in contrast to oxygen release systems where only hydrogen is collected, venting is required. Venting allows for the release of pressure should a pressure imbalance between the hydrogen-side and the oxygen-side of the system arise. Such pressure imbalances can arise when the hydrogen and oxygen output streams are disrupted (e.g., a collection tank is full, a collection tank switch is underway, etc.). Advantageously, the regulator disclosed herein utilizes a flexible diaphragm and three valve assemblies to (1) avoid large or sustained pressure imbalances between the hydrogen-side and the oxygen-side; (2) vent the hydrogen-side should a threshold pressure differential arise with a relatively high hydrogen pressure; and (3) vent the oxygen-side should a threshold pressure differential arise with a relatively high oxygen pressure. The regulator performs these three tasks without active control inputs of any kind and with computer-like efficiency.

In one embodiment, the regulator comprises a first housing section and a second housing section and has a first end and a second end. The first housing section and the second housing section cooperate to define a first internal cavity with a first valve assembly disposed therein, a second internal cavity with a second valve assembly disposed therein, and a third internal cavity with a third valve assembly disposed therein. The first housing section defines a hydrogen gas inlet in fluid communication with a hydrogen fluid path, a hydrogen outlet port, and a hydrogen vent port. The second housing section defines an oxygen gas inlet in fluid communication with an oxygen fluid path, an oxygen outlet port, and an oxygen vent port. A flexible diaphragm having a first side and a second side is clamped between the first housing section and the second housing section. A first hemispherical hydrogen chamber is positioned on the first side of the flexible diaphragm and a first oxygen chamber is positioned on the second side of the flexible diaphragm within the first internal cavity. The first valve assembly extends through the flexible diaphragm and includes a first valve pin in alignment with a first valve seat in the first housing section and includes a second valve pin in alignment with a second valve seat in the second housing section. A pressure differential between the first hydrogen chamber and the first oxygen chamber causes the flexible diaphragm to deflect toward a region of lesser pressure, such that the first valve assembly restricts and then seals the hydrogen outlet port for the first hydrogen chamber or the oxygen outlet port for the first oxygen chamber to equalize pressure within the first hydrogen chamber and the first oxygen chamber. A second hydrogen chamber in fluid communication with the first hydrogen chamber is positioned on the first side of the flexible diaphragm and a second oxygen chamber in fluid communication with the first oxygen chamber is positioned on the second side of the flexible diaphragm. The second valve assembly extends through the flexible diaphragm and includes a third valve pin seated in a third valve seat in second hydrogen chamber and includes a first biasing element in the second oxygen chamber biasing the third valve pin into the third valve seat, wherein a threshold pressure differential between the second hydrogen chamber and the second oxygen chamber due to excess pressure in the second hydrogen chamber causes the flexible diaphragm to overcome the first biasing element and deflect toward a region of lesser pressure in the second oxygen chamber to open the second valve assembly to release gas through the hydrogen vent port. A third hydrogen chamber in fluid communication with the second hydrogen chamber is positioned on the first side of the flexible diaphragm and a third oxygen chamber in fluid communication with the second oxygen chamber is positioned on the second side of the flexible diaphragm. The third valve assembly extends through the flexible diaphragm and includes a fourth valve pin seated in a fourth valve seat in the third oxygen chamber and includes a second biasing element in the third hydrogen chamber biasing the fourth valve pin into the fourth valve seat, wherein a threshold pressure differential between the third hydrogen chamber and the third oxygen chamber due to excess pressure in the third oxygen chamber causes the flexible diaphragm to overcome the second biasing element and deflect toward a region of lesser pressure in the third hydrogen chamber to open the third valve assembly to release gas through the oxygen vent port.

In another embodiment, the regulator has a first end and a second end and comprises a housing and three pistons. The housing includes a first housing section having a first hydrogen cylinder defining a first hydrogen chamber and hydrogen outlet port, a second hydrogen cylinder defining a second hydrogen chamber, and a third hydrogen cylinder defining a third hydrogen chamber and a hydrogen vent port. The housing also includes a second housing section having a first oxygen cylinder defining first oxygen chamber and an oxygen output port, a second oxygen cylinder defining a second oxygen chamber and an oxygen vent port, and a third oxygen cylinder defining a third oxygen chamber. A first piston has a first end and a second end, the first end is slidably engaged in the first hydrogen chamber and the second end is slidably engaged in the first oxygen chamber. A second piston has a first end and a second end, the first end is slidably engaged in the second hydrogen chamber and the second end is slidably engaged in the second oxygen chamber. A third piston has a first end and a second end, the first end is slidably engaged in the third hydrogen chamber and the second end is slidably engaged in the third oxygen chamber. A hydrogen line is in fluid communication with a hydrogen inlet port, the first hydrogen chamber, the second hydrogen chamber, and the third hydrogen chamber. An oxygen line is in fluid communication with an oxygen inlet port, the first oxygen chamber, the second oxygen chamber, and the third oxygen chamber. The first piston extends between the first hydrogen cylinder and the first oxygen cylinder and includes a first valve pin in alignment with a hydrogen output valve seat in the first hydrogen cylinder and includes a second valve pin, opposite the first valve pin, in alignment with an oxygen outlet valve seat in the first oxygen cylinder, wherein a pressure differential between the first hydrogen chamber and the first oxygen chamber causes the piston to move towards a region of lesser pressure, such that the piston restricts and then seals the hydrogen outlet port for the first hydrogen chamber or the oxygen outlet port for the first oxygen chamber to equalize pressure within the first hydrogen chamber and the first oxygen chamber. The second piston extends between the second hydrogen cylinder and the second oxygen cylinder and includes a third valve pin seated in an oxygen vent valve seat in the second oxygen chamber. A first biasing element in the second hydrogen chamber biases the third valve pin into the oxygen vent valve seat, wherein a threshold pressure differential between the second hydrogen chamber and the second oxygen chamber due to excess pressure in the second oxygen chamber causes the second piston to overcome the first biasing element and move toward a region of lesser pressure in the second hydrogen chamber to remove the third valve pin from the oxygen vent valve seat to release oxygen through the oxygen vent port. The third piston extends between the third hydrogen cylinder and the third oxygen cylinder and includes a fourth valve pin seated in a hydrogen vent valve seat in the third hydrogen chamber. A second biasing element in the third oxygen chamber biases the third valve pin into the hydrogen vent valve seat, wherein a threshold pressure differential between the third hydrogen chamber and the third oxygen chamber due to excess pressure in the third hydrogen chamber causes the third piston to overcome the second biasing element and move toward a region of lesser pressure in the third oxygen chamber to remove the fourth valve pin from the hydrogen vent valve seat to release hydrogen through the hydrogen vent port. Typically, the oxygen vent port and the hydrogen vent port are in fluid communication with a local atmosphere, and the hydrogen outlet port and the oxygen outlet port are in fluid communication with an exterior hydrogen storage vessel and an exterior oxygen storage vessel, respectively.

In one embodiment, the system comprises a high-pressure containment vessel and a cover. The high-pressure containment vessel has at least one of a sidewall and a floor that define an exterior surface and an interior surface. The interior surface at least partially defines a hydrogen plenum. The cover is positioned opposite the floor and coupled to the at least one sidewall of the high-pressure containment vessel. The cover defines an upper and a lower surface and includes a plurality of high-pressure fittings. One or more PEM cells, an oxygen-water separator, and a regulator are disposed in the hydrogen plenum. The oxygen-water separator receives and stores water from an exterior of the high-pressure containment vessel, supplies water to the one or more PEM cells, and receives oxygenated water from an anode-side of the one or more PEM cells. The oxygen-water separator includes an oxygen outlet line. The passive dual regulator with relative differential venting includes an oxygen fluid path in fluid communication with the hydrogen plenum, an exterior hydrogen storage vessel, and an exterior of the high-pressure containment vessel. The passive dual regulator with relative differential venting also includes an oxygen fluid path in fluid communication with the oxygen outlet line of the oxygen-water separator, an exterior oxygen storage vessel, and an exterior of the high-pressure containment vessel. The regulator regulates pressure imbalances between an oxygen-side of the contained system and the hydrogen-side of the contained system, and vents oxygen and the hydrogen to an exterior of the high-pressure containment vessel to allow the collection of both hydrogen and oxygen and avoid rupture of an electrolyzer membrane in the one or more PEM cells.

The hydrogen produced by the system is used to pressurize the containment vessel. Because the system is contained, and hydrogen pressure within the hydrogen plenum is elevated and balanced with the oxygen pressure on the oxygen-side of the system, the components of the system in the hydrogen plenum (hoses, couplings, valves, PEM cells, vessels, etc.) can be standard and do not have to be pressure rated. As such, the pressurized system can be produced at relatively low cost.

Further, the system captures both hydrogen and oxygen and uses the output streams to store the energy created during the decomposition of water as potential energy and then uses the potential energy to generate mechanical energy to power the devices that consume energy. In particular, the oxygen is used to store energy. More specifically, energy released during decomposition of water is captured as potential energy in the pressurized oxygen generated and stored. In turn, the captured potential energy in the stored oxygen is converted to mechanical energy. For example, in some embodiments, the oxygen is used to power a hydrogen gas booster that converts potential energy stored in oxygen produced by the system and stored in an exterior oxygen storage vessel into mechanical energy and moves hydrogen stored in the exterior hydrogen storage vessel into a secondary storage tank or vessel, e.g., a vehicle tank or methanol reactor, at a higher pressure. As another example, in some embodiments, the oxygen is used to power a water booster that converts potential energy stored in the oxygen produced by the system and stored in the exterior oxygen storage vessel into mechanical energy to inject water from an exterior water supply tank into the oxygen-water separator in the high-pressure containment vessel.

In some embodiments, the system is modular, i.e., the system is a modular hydrogen generation system or a modular system. Of course, the regulators and methods described herein are not limited to use of embodiments of the system that are modular. That said, the embodiment of modular system described herein comprises a high-pressure containment vessel and a hydrogen generation insert. The high-pressure containment vessel has a sidewall and a floor and defines an opening opposite the floor and a hydrogen plenum therebetween. The hydrogen generation insert has a first end and a second end and is shaped to be inserted through the opening and into the hydrogen plenum. The hydrogen insert includes a cover, one or more PEM cells, an oxygen-water separator, and a regulator. The cover at the first end of the insert defines an upper and a lower surface and includes the plurality of high-pressure fittings. The oxygen-water separator is in fluid communication with the one or more PEM cells for supplying water thereto and receiving oxygenated water therefrom, and an oxygen line. The regulator is coupled to the oxygen line of the oxygen-water separator and the hydrogen plenum. When the insert is received in the high-pressure containment vessel, the regulator regulates pressure imbalances between an oxygen-side of the system and vents oxygen and hydrogen to an exterior of the high-pressure containment vessel to allow the collection of both hydrogen and oxygen while avoiding rupture of the membranes in the one or more PEM cells and hydrogen and oxygen can be produced at an interior pressure of from 200 to 5,000 psi. The modular nature of this embodiment of the system allows for efficient and inexpensive assembly of the hydrogen generation insert as well as efficient assembly of the system itself.

In yet another embodiment, a method of generating hydrogen and oxygen with the system is disclosed. The system includes a high-pressure containment vessel defining a hydrogen plenum having a PEM cell stack, an oxygen-water separator, and a passive dual modulating regulator with relative differential venting disposed therein. The method comprising the steps of: injecting distilled water into the oxygen-water separator; fueling the PEM cell stack with water from the oxygen-water separator; applying voltage to the PEM cell stack to hydrolyze water and produce hydrogen and hydrogenated water from a cathode-side of the PEM cell stack and oxygenated water from an anode-side of the PEM cell stack; supplying the regulator with hydrogen from the hydrogen plenum; separating oxygen gas from the oxygenated water in the oxygen-water separator and supplying the regulator with oxygen; regulating a hydrogen discharge rate and an oxygen discharge rate to prevent pressure imbalances between the oxygen-side of the hydrogen generation system and the hydrogen plenum to avoid rupture of membranes within the PEM cells in a PEM cell stack; venting hydrogen from the regulator to an exterior of the high-pressure containment vessel when a pressure differential between an oxygen-side of the system and the hydrogen plenum reaches a threshold level due to excess hydrogen pressure until the pressure differential falls below the threshold level; and venting oxygen from the regulator to an exterior of the high-pressure containment vessel when a pressure differential between the oxygen-side of the system and the hydrogen plenum reaches a threshold level due to excess oxygen pressure until the pressure differential falls below the threshold level. The method relies on passive differential regulation and venting in a computer-like fashion. Plus, the method uses the hydrogen and oxygen output streams to store energy created during the decomposition of water as potential energy and uses the energy to generate mechanical energy to power energy requiring steps.

The hydrogen generation system and passive dual modulating regulator with relative differential venting are not limited to fuel applications and methanol production and can be used in other systems as desired, including emergency backup power, transportation, and propulsion systems. These and other features and advantages of the present disclosure will become apparent from the following description of an embodiment of the disclosure, when viewed in accordance with the accompanying drawings and appended claims. The hydrogen generation system disclosed herein is not limited to a particular passive dual modulating regulator with relative differential venting design. Likewise, the passive dual modulating regulator with relative differential venting disclosed herein is not limited to use with the hydrogen generation systems disclosed here.

BRIEF DESCRIPTION OF THE DRAWINGS

FIG. 6A illustrates a perspective view of an embodiment of a high-pressure electrical fitting for use with the cover of FIG. 4.

FIG. 6B illustrates a perspective view an embodiment of a high-pressure electrical line for use with the high-pressure electrical fitting of FIG. 6A.

FIG. 7 illustrates an embodiment of a PEM cell for use with the hydrogen generation system of FIG. 1.

FIG. 15 illustrates a front perspective view of an embodiment of a housing section of an embodiment of the passive dual modulating regulator with relative differential venting.

FIG. 16 illustrates a back perspective view of the housing section of FIG. 15.

FIGS. 32A-32B illustrate a flow chart detailing an embodiment of a method of generating hydrogen and oxygen with a contained hydrogen generation system that converts potential energy stored in the oxygen produced by the system and stored in an exterior oxygen storage vessel into mechanical energy power tasks such as, but not limited to, using a water booster to inject deionized water into the oxygen-water separator and moving hydrogen stored in an exterior hydrogen storage vessel into a secondary storage tank, e.g. a vehicle hydrogen tank.

FIGS. 33A-33B illustrate a flow chart detailing an embodiment of a method of generating hydrogen and oxygen with a contained hydrogen generation system that uses the hydrogen produced to supply a methanol reactor that reacts carbon dioxide from air and the hydrogen in the presence of a catalyst to produce methanol.

DETAILED DESCRIPTION OF THE CURRENT EMBODIMENTS

The current embodiments include a passive dual modulating regulator with relative differential venting ("regulator"). The regulator (1) regulates hydrogen and oxygen output to respond to a pressure differential between a hydrogen-side and an oxygen-side of a membrane in a proton-exchange membrane ("PEM") cell so that the membrane does not rupture; (2) vents the hydrogen-side should a threshold pressure differential arise because of a relatively high hydrogen pressure (e.g. caused by a disruption due to hydrogen output and collection); and (3) vents the oxygen-side should a threshold pressure differential arise because of a relatively high oxygen pressure (e.g. caused by a disruption due to oxygen output and collection). In many embodiments, the regulator performs these three tasks without active control inputs of any kind and with computer-like efficiency. Large or sustained pressure imbalances between the hydrogen-side and the oxygen-side are avoided without active control inputs of any kind. Before the regulator is discussed in detail, an exemplary hydrogen generation system ("system") having one or more PEM cells is disclosed and described. While this system is described below as generating hydrogen fuel for vehicles and methanol production, the regulator is not limited to any one such system, and can be used in other systems as desired. Generally, hydrogen generation with the system 10 occurs at elevated pressures in the high-pressure containment vessel 20.

Figure 1:
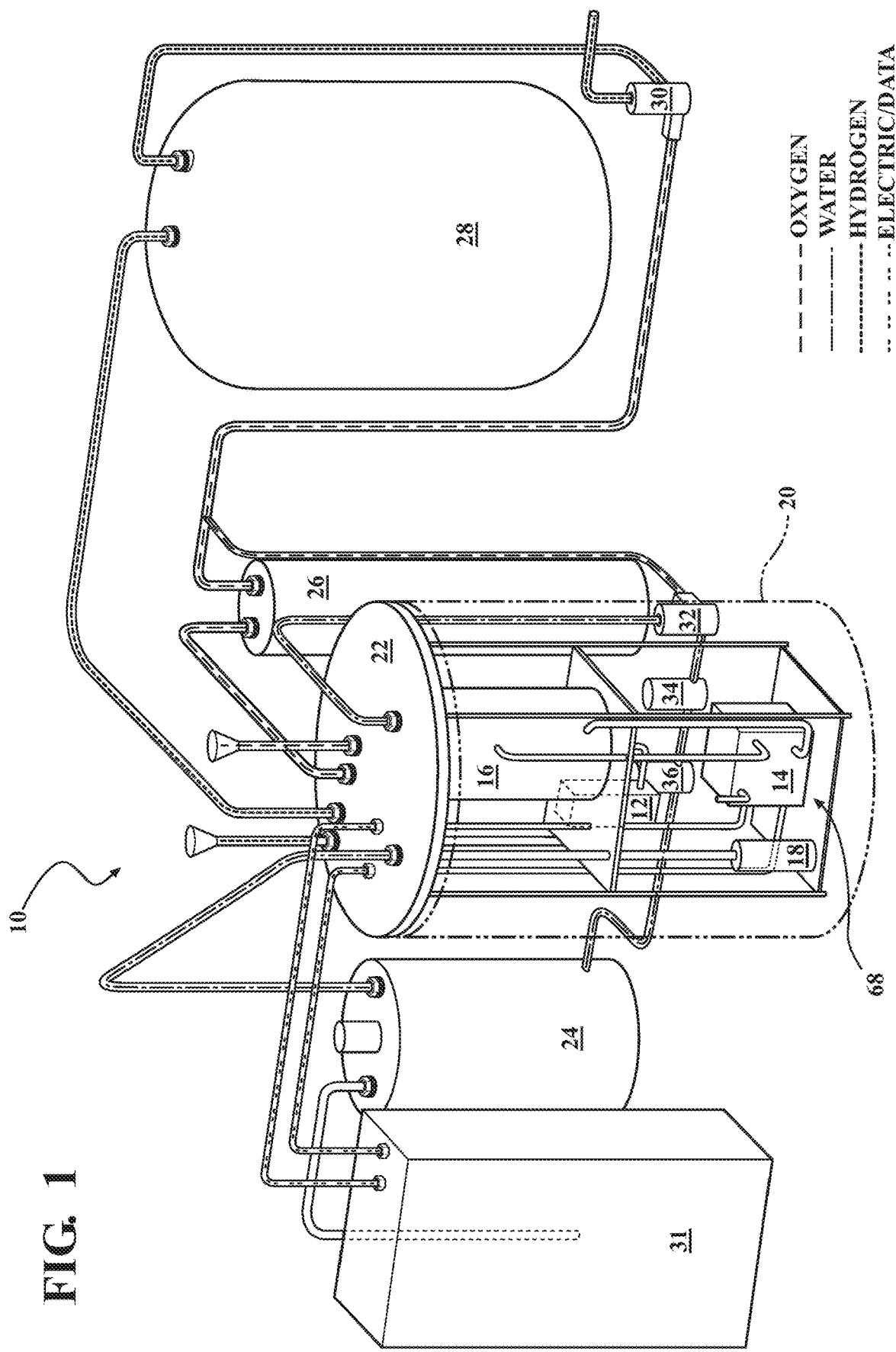
FIG. 1 is a schematic diagram of a hydrogen generation system in accordance with one embodiment.

Referring first to FIG. 1, the system in accordance with an exemplary embodiment includes a high-pressure containment vessel 20, a cover 22 (sometimes referred to as a bulkhead), one or more PEM cells 14, an oxygen-water separator 16, and the regulator 12. The high-pressure containment vessel 20 has at least one sidewall and a floor, which at least partially defines an exterior surface and an interior surface. The interior surface at least partially defines a hydrogen plenum 42. The cover 22, opposite the floor, is coupled to the at least one sidewall of the high-pressure containment vessel 20. The cover 22 defines an upper and a lower surface and includes a plurality of high-pressure fittings 38. Generally, hydrogen generation with the system 10 occurs at elevated pressures in the high-pressure containment vessel 20.

The one or more PEM cells 14, the oxygen-water separator 16, and the regulator 12 are disposed in the hydrogen plenum 42. The regulator 12 is typically positioned inside the hydrogen plenum 42, but it should be appreciated that the regulator 12 can be positioned outside of the hydrogen plenum 42/high-pressure containment vessel 20 in other embodiments. The one or more PEM cells 14 receive water from the oxygen-water separator 16 and electrolyze the water received to produce hydrogen and oxygen gas. The hydrogen produced and water from the one or more PEM cells 14 is released into and pressurizes the hydrogen plenum 42. The oxygen-water separator 16 receives and stores water from an exterior of the high-pressure containment vessel 20. In a typical embodiment, the oxygen-water separator 16 has a capacity of from about 2 to about 15, from about 3 to about 10, or about 5 gallons. The oxygen-water separator 16 receives and stores water from an exterior water supply tank 24. In a typical embodiment, the exterior water supply tank 24 has a capacity of from about 5 to about 35, from about 10 to about 25, or about 15 gallons. The oxygen-water separator 16 supplies water to the one or more PEM cells 14, and receives oxygenated water from an anode-side of the one or more PEM cells 14. The oxygen-water separator 16 includes an oxygen transfer line that supplies oxygen to the regulator 12. The regulator 12 defines a hydrogen fluid path and an oxygen fluid path. The oxygen fluid path is in fluid communication with the hydrogen plenum 42, an exterior hydrogen storage vessel 28, and an exterior of the high-pressure containment vessel 20. The oxygen fluid path is in fluid communication with the oxygen outlet line of the oxygen-water separator 16, an exterior oxygen storage vessel 26, and an exterior of the high-pressure containment vessel 20. As is described in detail below, the regulator 12 regulates pressure imbalances between an oxygen-side of the system 10 and a hydrogen-side of the system 10, and vents oxygen and hydrogen to an exterior of the high-pressure containment vessel 20 to allow collection of both hydrogen and oxygen and avoid rupture of an electrolyzer membrane(s) in the one or more PEM cells 14.

The high-pressure containment vessel 20 can be used safely to collect hydrogen at internal pressures of up to 5,000 psi. The high-pressure containment vessel 20 can comprise metal and/or a high-strength composite material. The high-pressure containment vessel 20 is designed not to rupture and is held to rigorous performance requirements. Furthermore, the high-pressure containment vessel 20 typically undergoes extensive testing to make sure that it meets certain performance requirements. For example, in some embodiments, the high-pressure containment vessel 20 can accommodate more than twice a maximum pressure for standard operating conditions, and not fail.

Figure 4:
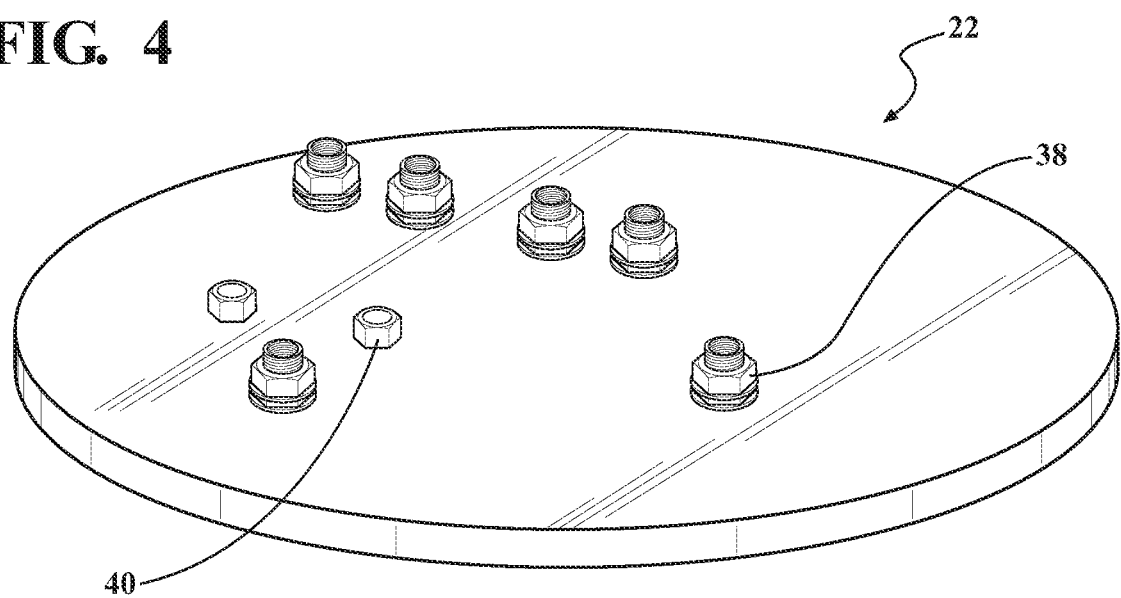
FIG. 4 is an isolated view of a cover of the hydrogen generation insert of FIG. 3.
Figure 5:
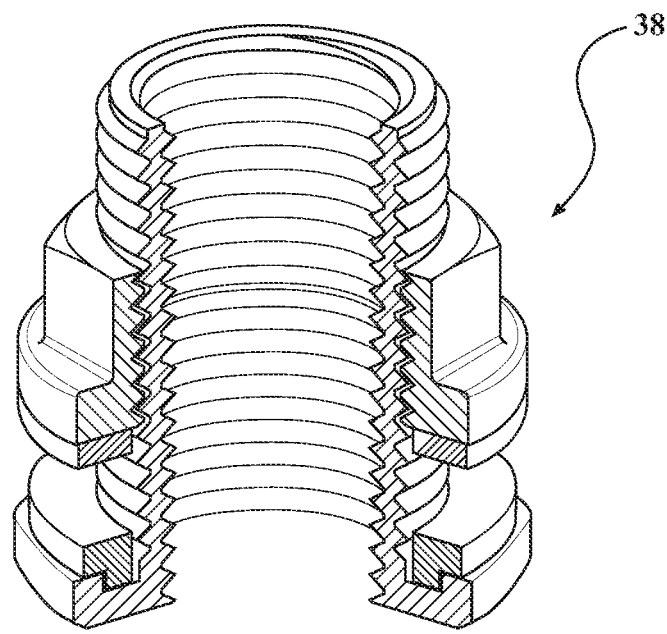
FIG. 5 illustrates a perspective view with a cut-out of an embodiment of a high-pressure fluid fitting for use with the cover of FIG. 4.

FIG. 4 is an isolated view of the cover 22. The cover 22 defines an upper and a lower surface and has the plurality of high-pressure fittings 38 thereon. FIG. 5 illustrates a perspective view of an exemplary high-pressure fitting with a cut-out. The cover 22 also has one or more high-pressure couplings 40 to enable delivery of electricity to the one or more PEM cells 14. FIG. 6A illustrates a perspective view an exemplary high-pressure electrical fitting for use with the cover 22 and FIG. 6B illustrates a perspective view of a high-pressure electrical line 41 that can be connected to the exemplary high-pressure electrical fitting that can be used in the pressurized hydrogen plenum 42. In some embodiments, the high-pressure electrical line 41 is a low amp control circuit bulkhead connector with a male and female component. These connectors have multiple electrical contacts. The internal control wires are connected to the internal components of the system 10. An external mated plug makes the connection to the control electronics in an exterior control panel.

In some embodiments, the cover 22 includes a safety release valve which is designed to vent the hydrogen plenum 42 to the atmosphere should an internal pressure in the high-pressure containment vessel 20 exceed a predetermined pressure threshold. In a typical embodiment, the cover 22 comprises a seal channel having an O ring therein. A first end of the high-pressure containment vessel 20 is shaped to receive the cover 22, which has a plurality of attachment features disposed about its outer periphery. The first end of the side wall includes a plurality of corresponding attachment features disposed about a periphery of an opening 44 at the first end of the high-pressure containment vessel 20. The plurality of attachment features of the cover 22 and the plurality of corresponding attachment features of the high-pressure containment vessel 20 are used to couple the cover 22 to the high-pressure containment to pneumatically seal the hydrogen plenum 42. That is, coupling of the plurality of attachment features of the cover 22 with the plurality of corresponding attachment features of the high-pressure containment vessel 20 results in a high-pressure pneumatic seal of the hydrogen plenum 42.

The one or more PEM cells 14 can include any of a variety of commercially available PEM cells having a PEM 58, an anode 60, and a cathode 56, generally depicted in FIG. 7. In many embodiments, the one or more PEM cells 14 included in a PEM cell stack, i.e., a plurality of PEM cells in series. At the anode 60 of each PEM cell, feed water is electrochemically split into protons ($H^+$), electrons ($e^-$), and oxygen ($O_2$). The protons are transported via the PEM 58 to the cathode 56. The electrons exit from the anode through an external power circuit, which provides the driving force (cell voltage) for the reaction. At the cathode 56, the protons and electrons combine to produce hydrogen. The system 10 is in electric communication with a power source 31 that creates the cell voltage for the one or more PEM cells 14 (e.g., series-connected PEM cells). The power source 31 can be solar photovoltaic, solar thermal, or geothermal, by non-limiting example.

The one or more the one or more PEM cells 14 require water and are in fluid communication with a source of distilled or deionized water. Referring again to FIG. 1, the supply of distilled or deionized water, for example distilled municipal water, is fed to the oxygen-water separator 16. In the embodiment illustrated, the system 10 includes the exterior water supply tank 24 that is outside of the high-pressure containment vessel 20 and in fluid communication with the oxygen-water separator 16. Feed water from the oxygen-water separator 16 is gravity fed via a feed line to the anode surface of the one or more PEM cells 14 (PEM cell stack) where it is separated into oxygen and hydrogen as set forth above. Hydrogen gas and trace amounts of water from the cathode-side of the one or more PEM cells 14 is released into the hydrogen plenum 42, which pressurizes the interior of the high-pressure containment vessel 20. An interior pressure within the high-pressure containment vessel 20 can be from 200 up to 3,000, 200 up to 4,000, 200 up to 5,000, or 200 to 6,000 psi during hydrogen generation. The hydrogen gas is drawn from the hydrogen plenum 42, and fed into an oxygen fluid path defined by the regulator 12. The oxygen-water separator 16 acts as the primary water reservoir for the one or more PEM cells 14 and collects excess water carried up with oxygen from the anode-side of the one or more PEM cells 14 via oxygen lines. Oxygen gas is then drawn through an oxygen output port on the oxygen-water separator 16 into an oxygen line, and fed into an oxygen fluid path defined by the regulator 12. The hydrogen fluid path and the oxygen fluid path are at least partially defined by the flexible diaphragm 120, and three valve assemblies are utilized to, as is explained below, maintain a balanced pressure between the hydrogen-side (e.g., the hydrogen plenum 42) and the oxygen-side of the one or more PEM cells 14. A hydrogen output line 74 is coupled to a first output port on the regulator 12 and a pressurized hydrogen storage tank exterior the high-pressure containment vessel 20 ("the exterior hydrogen storage vessel"). The oxygen output line 80 is coupled to a second output port on the regulator 12 and a pressurized oxygen storage vessel exterior the high-pressure containment vessel 20 ("the exterior oxygen storage vessel"). A first valve assembly 126 controls oxygen and hydrogen output. A second valve assembly 128 initiates oxygen venting to an exterior of the high-pressure containment vessel 20 when a threshold pressure differential is exceeded because of a relatively high hydrogen pressure. A hydrogen valve and gauge can be utilized for safely venting/discharging hydrogen gas into the atmosphere. A third valve assembly 130 initiates oxygen venting to an exterior of the high-pressure containment vessel 20 when a threshold pressure differential is exceeded because of a relatively high oxygen pressure. An oxygen valve and gauge can be utilized for safely venting/discharging oxygen gas into the atmosphere. Still referring to FIG. 1, in some embodiments, the system 10 includes a water collection reservoir 68 within the high-pressure containment vessel 20, wherein water from a cathode-side of the one or more PEM cells 14 accumulates. The one or more PEM cells 14 are at least partially located in the water collection reservoir 68, wherein water accumulated in the water collection reservoir 68 cools the one or more PEM cells 14 to remove excess heat generated during power generation to prevent short circuit currents between the one or more PEM cells 14. In the embodiment illustrated, the water collection reservoir 68 is defined by a second end of the high-pressure containment vessel 20 and comprising a portion of the hydrogen plenum 42 proximal the floor of the high-pressure containment vessel 20. In the embodiment illustrated, a float valve 18 removes water accumulated in the water collection reservoir 68, when the accumulated water exceeds a certain level. The float valve 18 returns the accumulated water, which is hydrogenated, to the exterior water supply tank 24. The accumulated water comes from bleed through of the one or more PEM cells 14. The accumulated water is allowed to rise near the top of the one or more PEM cells 14 to cool the one or more PEM cells 14. Heat generated by the one or more PEM cells 14 is transferred to the one or more PEM cells 14 and then to the high-pressure containment vessel 20 where it is dissipated in the air.

Figure 8:
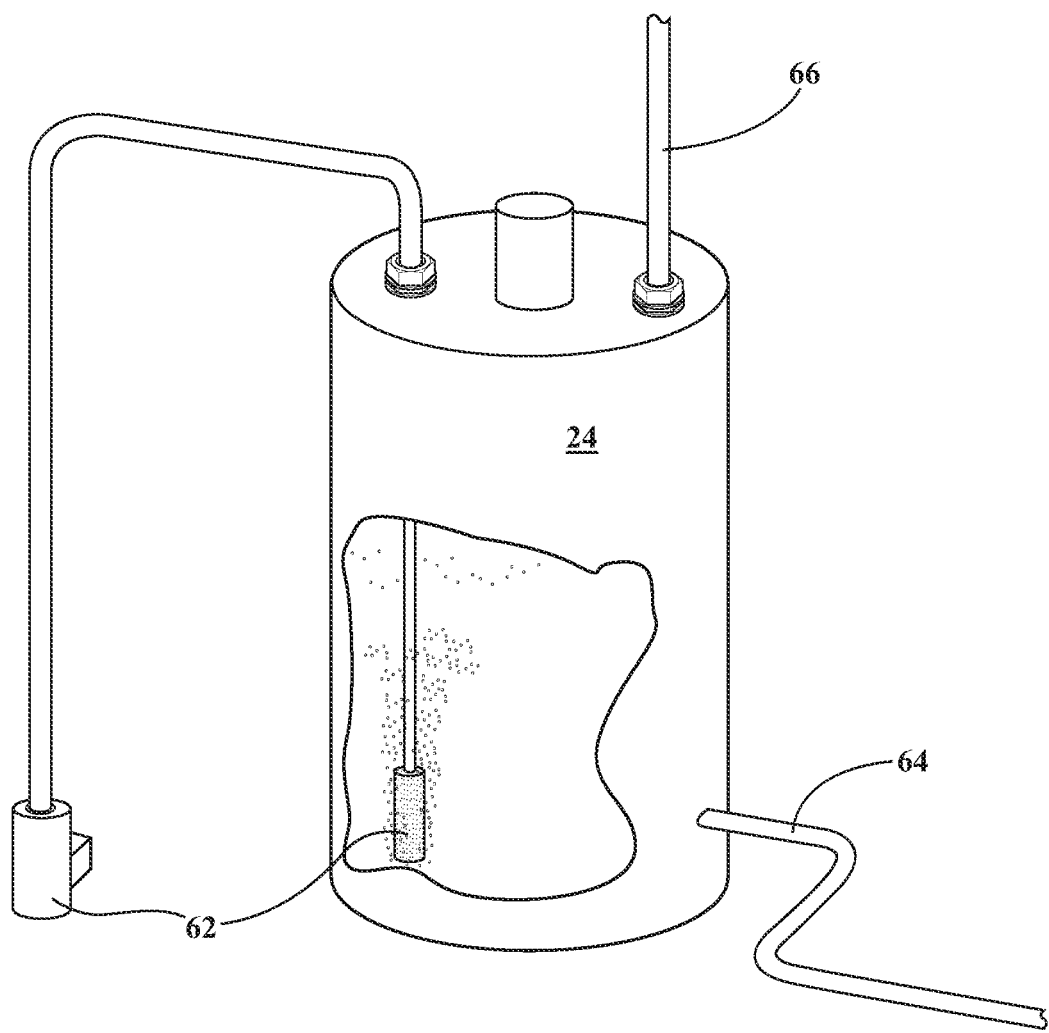
FIG. 8 is an isolated perspective view with a cut-out of an embodiment of a water supply and reclamation tank including a dehydrogenator for use with the hydrogen generation system of FIG. 1.

The water is removed from the water collection reservoir 68, collected in the water supply tank 24, dehydrogenated, optionally filtered and deionized, and re-released to the exterior water supply tank 24 exterior the high-pressure containment vessel 20 for reclamation. Referring now to FIG. 8, the reclaimed water is received through a reclamation line 66 and deyhdrogenated water is supplied to the oxygen-water separator 16 through a water supply line 64. The exterior water supply tank 24 includes a dehydrogenator 62 comprising a pump and release assembly. The dehydrogenator 62 captures air from the immediate atmosphere and percolates the captured air into water stored in the water supply tank 24 to remove excess hydrogen present due to water reclamation from the hydrogen generation system 10.

In some embodiments, the exterior water supply tank 24 utilizes a larger capacity to increase the dwell time of the reclaimed water while the air bubbling from the dehydrogenator 62 removes the dissolved hydrogen from the reclaimed water before it is returned to the oxygen-water separator 16 (essentially the internal water tank) and ultimately the one or more PEM cells 14. This prevents hydrogen contamination on the oxygen-side of the system 10.

As hydrogen is produced, it is stored in the exterior hydrogen storage vessel, which is pressurized. No compressor is required to pressurize the exterior hydrogen storage vessel. In one embodiment, the one or more PEM cells 14 produce hydrogen continually until a pressure limit is reached, prompting actuation of a shutoff switch. Hydrogen is produced at twice the rate of oxygen, so the exterior hydrogen storage vessel is typically larger than the exterior oxygen storage vessel 26.

As oxygen is produced, it is stored in the exterior oxygen storage vessel 26, which is pressurized. No compressor is required to pressurize the exterior oxygen storage vessel 26. In one embodiment, the one or more PEM cells 14 produce oxygen continually until a pressure limit is reached, prompting actuation of a shutoff switch. Oxygen is produced at half the rate of hydrogen, so the exterior oxygen storage vessel 26 is typically smaller than the exterior oxygen storage vessel 26.

Figure 9:
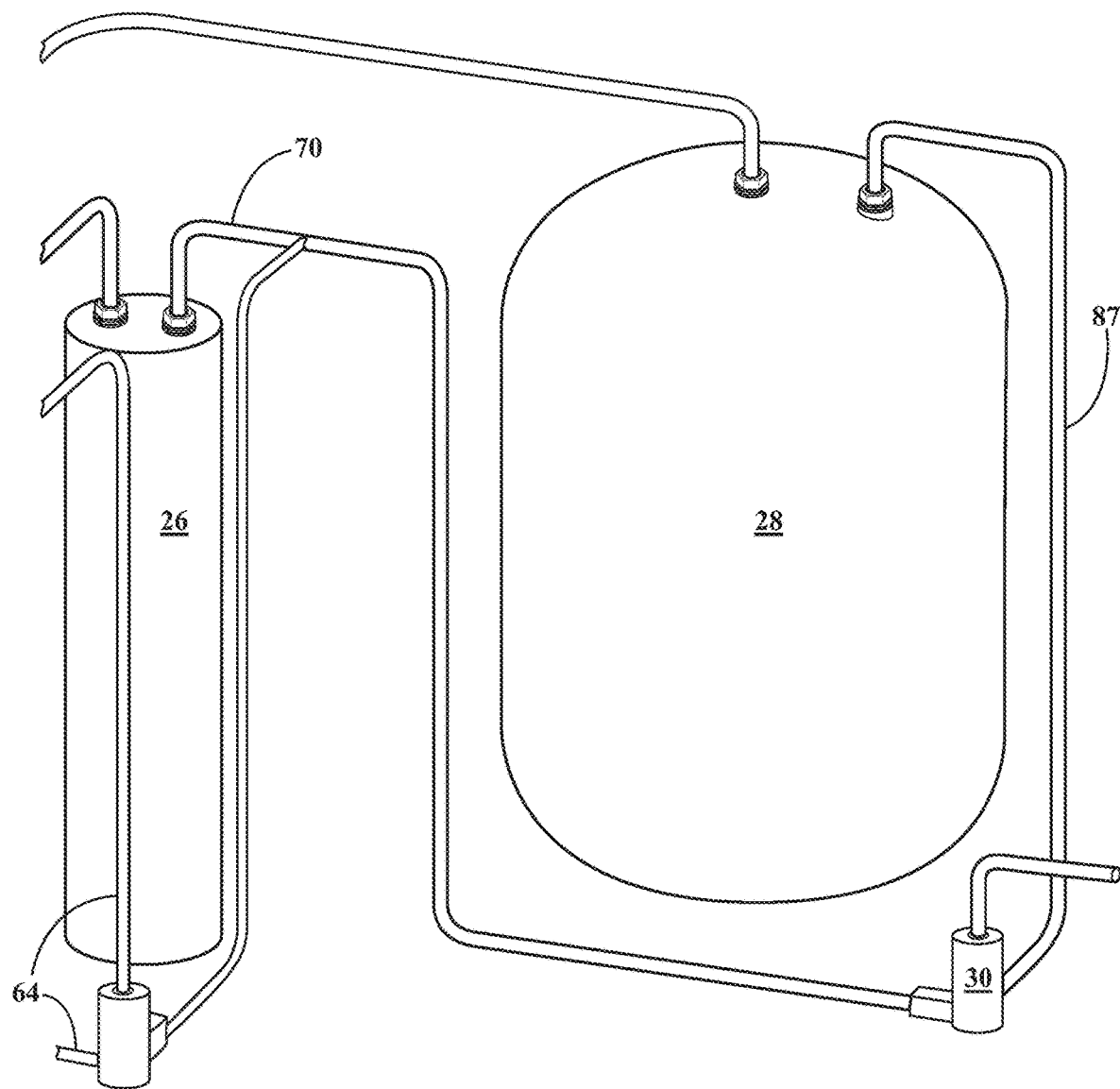
FIG. 9 is an isolated perspective view of an embodiment of an exterior oxygen storage vessel in fluid communication with a hydrogen gas booster and a water booster for use with the hydrogen generation system of FIG. 1.

The pressurized oxygen stored in the exterior oxygen storage vessel 26 can be used to power one or more devices. Collection of the oxygen produced by the system 10 allows the capture of energy released during decomposition of water and the storage of the captured energy as potential energy in the pressurized oxygen generated and stored in the exterior oxygen storage vessel 26. In turn, the potential energy in the pressurized oxygen is converted into mechanical energy and employed as desired. FIG. 9 is an isolated perspective view of the exterior oxygen storage vessel 26 in fluid communication with a hydrogen gas booster 30 and a water booster 32 for use with the system 10 of FIG. 1.

Figure 10:
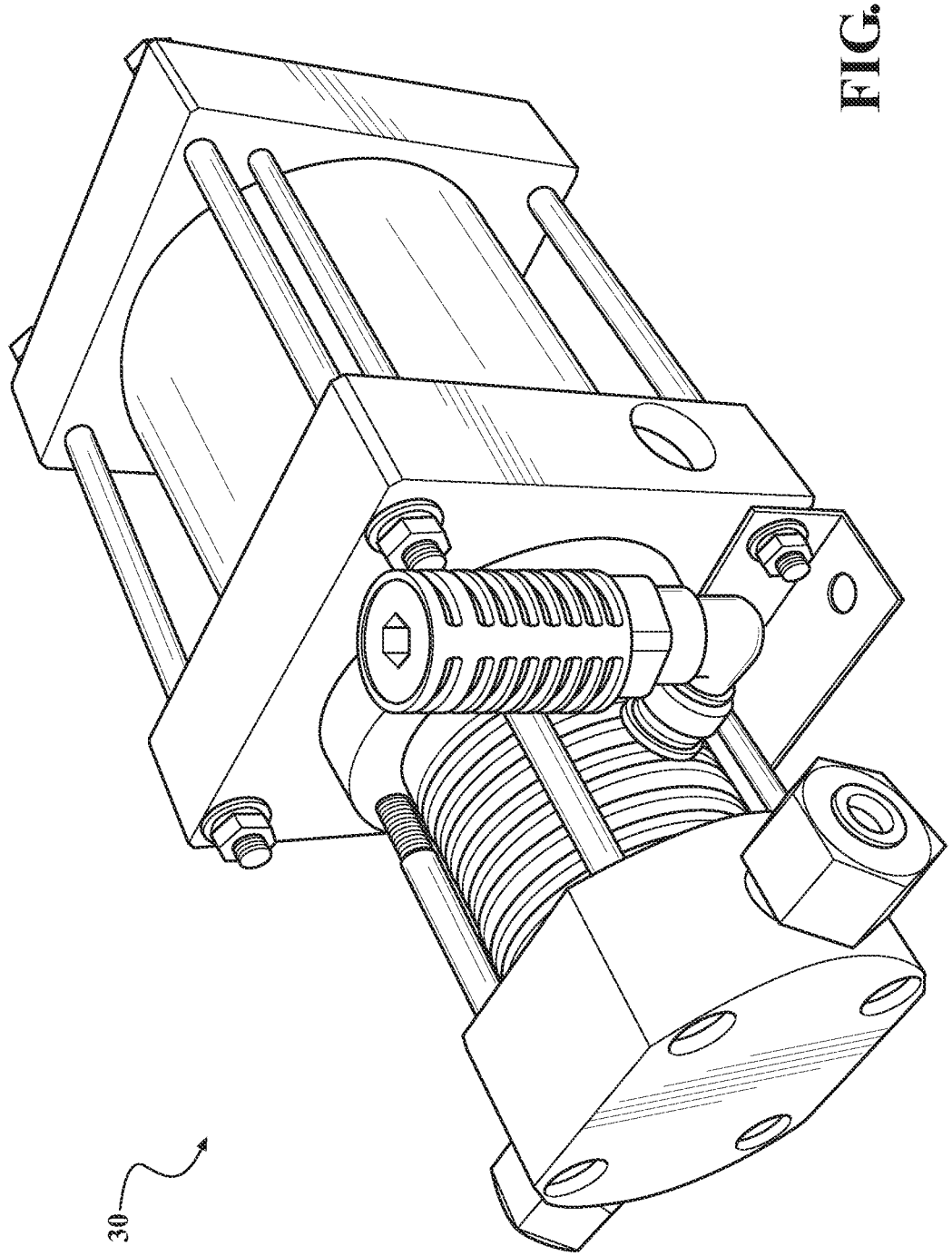
FIG. 10 is a close-up perspective view of an embodiment of the hydrogen gas booster of FIG. 9, which is powered by oxygen stored in the exterior oxygen storage vessel, which is used to fill a secondary storage tank such as a vehicular storage tank with hydrogen from the exterior hydrogen storage vessel.

In the embodiment illustrated in FIG. 1, the system 10 includes the hydrogen gas booster 30 that is in fluid communication with the exterior oxygen storage vessel 26. The hydrogen gas booster 30 converts potential energy stored in oxygen produced by the system 10 and stored in the exterior oxygen storage vessel 26 into mechanical energy and moves hydrogen stored in the exterior hydrogen storage vessel 28 into a secondary storage tank, e.g., a hydrogen tank in a vehicle, at a higher pressure. In some embodiments, the hydrogen gas booster 30 is used for filling and pressurizing hydrogen consuming equipment such as hydrogen fuel cell cars that require high pressure hydrogen of 5,000, 7,000, or 10,000 psi and higher. For example, the hydrogen gas booster 30 can be used to fill vehicular storage tanks having an internal pressure of from about 3,000 to about 20,000 psi. FIG. 10 is a close-up perspective view of the hydrogen gas booster 30 of FIG. 9, which is powered by oxygen stored in the exterior oxygen storage vessel 26, which is used to fill a secondary storage tank such as a vehicular storage tank with hydrogen from the exterior hydrogen storage vessel 28.

Figure 11:
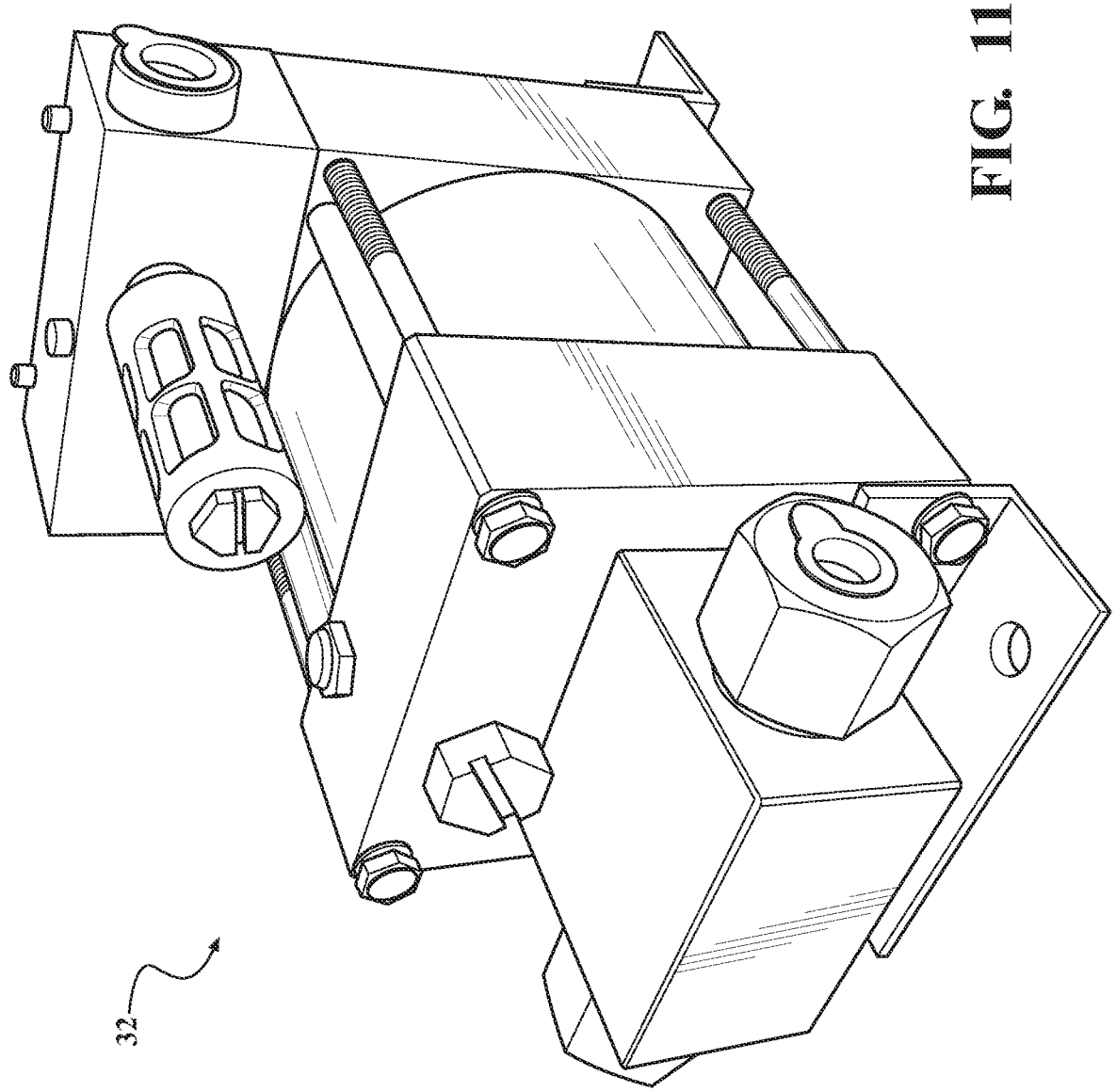
FIG. 11 is a close-up perspective view of an embodiment of the water booster of FIG. 1, which is powered by oxygen stored in the exterior oxygen storage vessel, which is used to supply the oxygen-water separator with deionized water.

Referring again to FIG. 1, the embodiment illustrated includes the water booster 32 that is in fluid communication with the exterior oxygen storage vessel 26. The water booster 32 converts potential energy stored in the oxygen produced by the system 10 and stored in the exterior oxygen storage vessel 26 into mechanical energy and pumps water from the exterior water supply tank 24 (e.g., having a 15-gallon capacity) into the oxygen-water separator 16 (e.g., having a 5-gallon capacity). FIG. 11 is a close-up perspective view of the water booster 32 of FIG. 1, which is powered by oxygen stored in the exterior oxygen storage vessel 26, which is used to supply the oxygen-water separator 16 with deionized water. In this embodiment, the supply line 64 extends from the exterior water supply tank 24 to the cover 22 with a particle filter 34, a deionizing filter 36, and the water booster 32. An oxygen booster line 70 is used to power the boosters 30, 32 of FIGS. 10 and 11.

In some embodiments, the deionizing filter 36 is a resin-type de-ionizing filter. The embodiment of the system 10 illustrated use of distilled or de-ionized water. However, due to the potential of the water supplied reacting with materials in the system 10 and damaging or disrupting the system 10, the particle filter 34 and deionizing filter 36 are used as a precaution. That said, the system does not require the particle filter 34 and deionizing filter 36.

Figure 12:
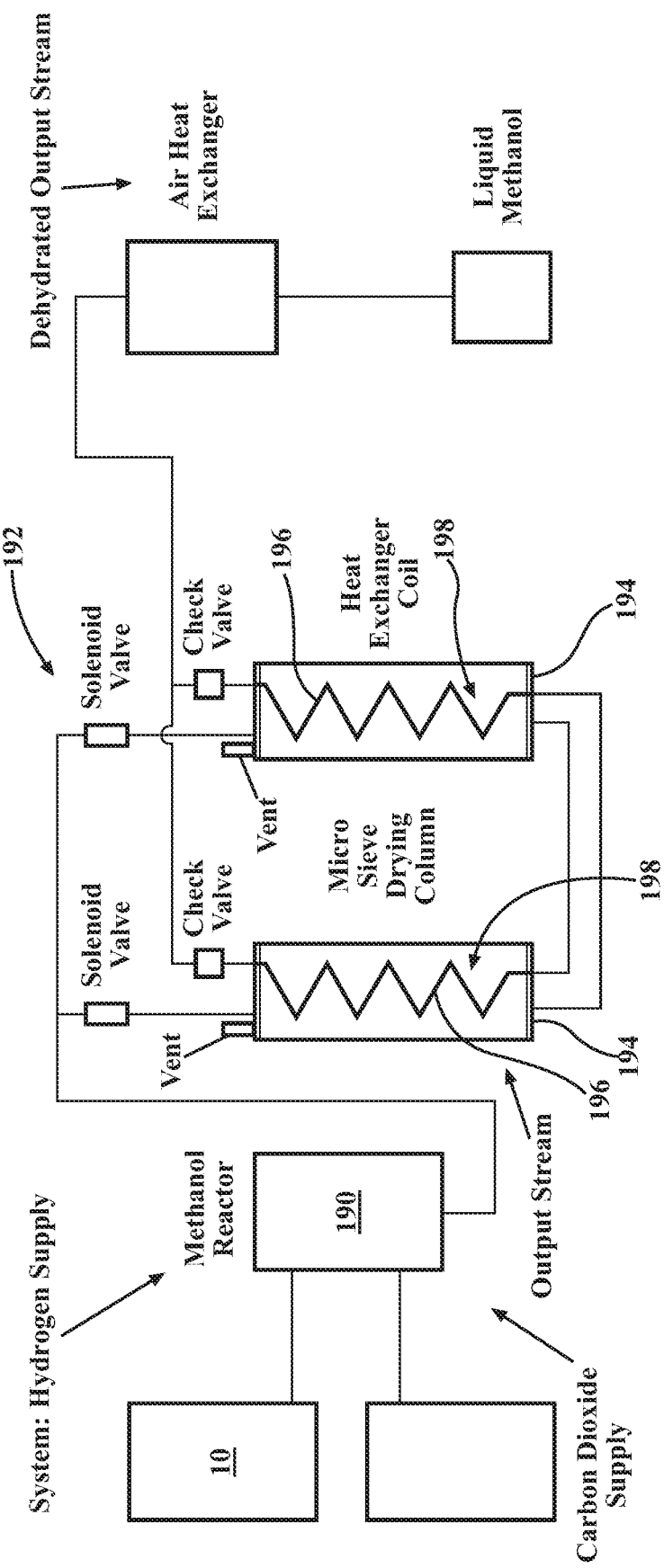
FIG. 12 is a schematic diagram of an embodiment of a methanol reactor and a dryer for use with the hydrogen generation system of FIG. 1.

With reference now to FIG. 12, in one embodiment, the system 10 includes a methanol reactor 190 that is in fluid communication with the exterior hydrogen storage vessel 28 that reacts carbon dioxide and the hydrogen generated by the system 10 in the presence of a catalyst to produce methanol. Various methanol reactors known in the art can be used with the system. Generally, the reaction to produce methanol involves the reduction of carbon dioxide with the hydrogen gas acting as the reducing agent to produce methanol and water. In some embodiments, the method of producing methanol involves the step filling a vessel with carbon dioxide and introducing hydrogen into the vessel until the temperature of the vessel rises to a predetermined temperature, e.g., 300° C., stop adding hydrogen until the methanol reactor 190 cools off, so on and so forth. The carbon dioxide used can be from air, generated, and captured by industry, or from any other source. The methanol reactor 190 is designed to produce methanol through the catalytic conversion of an input stream comprising a mixture of carbon dioxide and hydrogen. The production of methanol in the methanol reactor 190 involves the exothermic reaction of hydrogen and carbon dioxide and produces an output stream comprising methanol and water at elevated temperatures (e.g., at temperatures of from 150-400° C. and comprising about 20% water). Of course, methanol production with the methanol reactor 190 is a synergistic pairing with the system because the reactions in the methanol reactor 190 favor production at moderate to high temperatures and higher pressures which, when paired with the high-pressure hydrogen production of the system create efficiencies in methanol production.

Various catalysts known in the art can be used in the methanol reaction. Some non-limiting examples of catalysts used catalysts comprising copper (Cu), typically in the form of copper/zinc oxide often in combination with other metal oxides such as aluminum oxide ($Al_2O_3$). These catalysts are often referred to as $Cu/ZnO/Al_2O_3$ catalysts. Some catalysts may include magnesium oxide (MgO) to further enhance performance. Of course, non-copper-based catalysts can also be used, including: palladium-based catalysts, nickel-based catalysts, bimetallic catalysts, homogeneous catalysts (e.g., Iridium complexes), and other catalysts know in the art.

In some embodiments, the methanol reactor 190 includes a guard bed comprising materials such as activated carbon or specific adsorbents to protect the primary catalyst used from poisons such as sulfur compounds, chlorine, and iron carbonyls present in the input feed, which can deactivate the catalyst and reduce its lifespan. The selection of the specific catalyst formulation and reactor type depends on factors such as input composition, desired production rate, and economic considerations.

The methanol reactor 190 is connected to an energy source. The energy source can be solar photovoltaic, solar thermal, geothermal, or a device that converts pressurized oxygen or hydrogen produced by the system 10 to energy. Of course, these additional efficiencies associated with the use of energy created by the use of high-pressure oxygen produced by the system is yet another synergistic aspect of pairing the methanol reactor 190 with the system described herein.

With continued reference to FIG. 12, in some embodiments, the system further comprises a dryer 192 in fluidic communication with the output stream of the methanol reactor 190. In a typical embodiment, the dryer 192 comprises a plurality of columns 194, each of the plurality of columns 194 defining an internal cavity including a heat exchanger 196 and micro sieves 198. The dryer 192 diverts the output stream to a column with dry micro sieves 198 and simultaneously uses the heat exchanger 196 to dehydrate the micro sieves 198 in a previously used column so on and so forth to continuously dehydrate the output stream. The dryer 192 is in fluidic communication with the output stream of the methanol reactor 190.

The schematic of FIG. 12 illustrates an example of the dryer 192 that utilizes two check valves, two solenoid valves, and two columns 194 to function. It should be appreciated that in practice and in many embodiments, the dryer 192 will include more than 2 columns. The output stream (e.g., comprising 80% methanol, 20% water and having a temperature of about 300° C.) is expelled from the methanol reactor 190. The heat from the exothermic synthesis of methanol is used to dry the output stream with the dryer—in many without the use of any external energy. In the example of FIG. 12, one solenoid valve would open at a time, allowing the output stream into one of the columns 194 until it becomes saturated and then switch to the other column 194, and then the dehydrated output stream exits the bottom of column 194 and enters the heat exchanger 196 of the opposite column 194. This will allows the still hot output stream to from the one column 194 to pass through the heat exchanger 196 of the other, drying or dehydrating saturated column, any leftover heat would eventually go through a final air heat exchanger until the dehydrated output stream comprising methanol is cool enough to remain a liquid at ambient temperature. The two check valves prevent backflow to the opposite column. There are two fluid paths through each column, one fluid path flow through the micro sieves to dehydrate the output stream and the other flows through the chamber to dehydrate wet micro sieves that were used to dehydrate the output stream.

The micro sieves 198 (sometimes referred to as molecular sieves) comprise materials used to remove moisture from liquids through adsorption. In various embodiments, the micro sieves 198 can comprise natural or synthetic aluminosilicates, activated carbon, silica gel, metal organic frameworks, carbon molecular sieves and other material know in the art. In a preferred embodiment, the micro sieves 198 comprise natural or synthetic aluminosilicates. In a preferred embodiment, the micro sieves 198 have a pore size A3 size (about 3 angstroms (Å))—an extremely small pore size, ideal for capturing very small molecules like water, while allowing larger molecules (such as methanol) to remain unaffected. That said, some embodiments utilize micro sieves 198 having a pore size of 4 A or 5 A.

With continued reference to FIG. 12, the heat exchanger 196 is typically a hollow insert comprising a conductive material such as but not limited to metal and can have various shapes and cross-sectional profiles. In a preferred embodiment, the heat exchanger 196 has a coiled shape with a round cross-sectional profile.

The dryer 192 is configured to feed the output stream into one of the plurality of columns 194 having dry micro sieves 198 to produce a dehydrated output stream, and when the one column is saturated the output stream is diverted by one of the plurality of valves to another of the plurality of columns 194 having dry micro sieves 198. Concurrently, another of the plurality of valves opens to vent the one column having wet or saturated micro sieves 198 and allow the heat exchanger 196 to heat and dehydrate the saturated/wet micro sieves 198 therein. The heat exchanger 196 is heated by the dehydrated output stream produced by the one column. As such, the dehydrated output stream is (1) used to heat the heat exchanger 196 (without using outside energy) and (2) reduce a temperature of the dehydrated output stream to a temperature below the boing point of methanol so it can be handled and safely packaged as a liquid. Of course, as explained previously, the output stream produced by the methanol reactor 190 is at an elevated temperature and should be cooled to avoid evaporation and so that the methanol can be packaged efficiently.

Embodiments of the dryer 192 are designed to enable the following steps: (1) feed the output stream into one of the plurality of columns 194 having dry micro sieves to produce a dehydrated output stream, and (2) vent one of the plurality of columns having wet micro sieves, feed the dehydrated output stream into a heat exchanger of the column to heat and evaporate the water from the wet micro sieves so the column can be reused, and reduce a temperature of the dehydrated output stream. The dryer 192 can include a controller and a plurality of columns 194 (e.g., 2, 3, 4, 5, 6, 7, or more columns 194) and depending on the size of the methanol reactor 190, size of the columns 194, the temperature of the output stream and other factors. One or more columns 194 can be used simultaneously to dehydrate the output stream which can comprise around 20% water. One or more columns 194 can also be concurrently vented and dehydrated with the internal heat exchangers. Depending on various factors, various protocols can be used and optimized to dehydrate and cool the output stream. The dryer 192 solves two problems (1) removal of water from the output stream and isolation of the methanol, and (2) cooling the methanol to a temperature below the boiling point of the methanol (64.7° C.).

As far as fill/collection of the methanol goes, in one embodiment, use of an auto float drain valve that opens when the liquid collocates at the end of the chain is employed when filling containers. Since the methanol is condensing after its cooled and pooled, use of the auto float valve will keep the methanol flowing without a pump.

Figure 2:
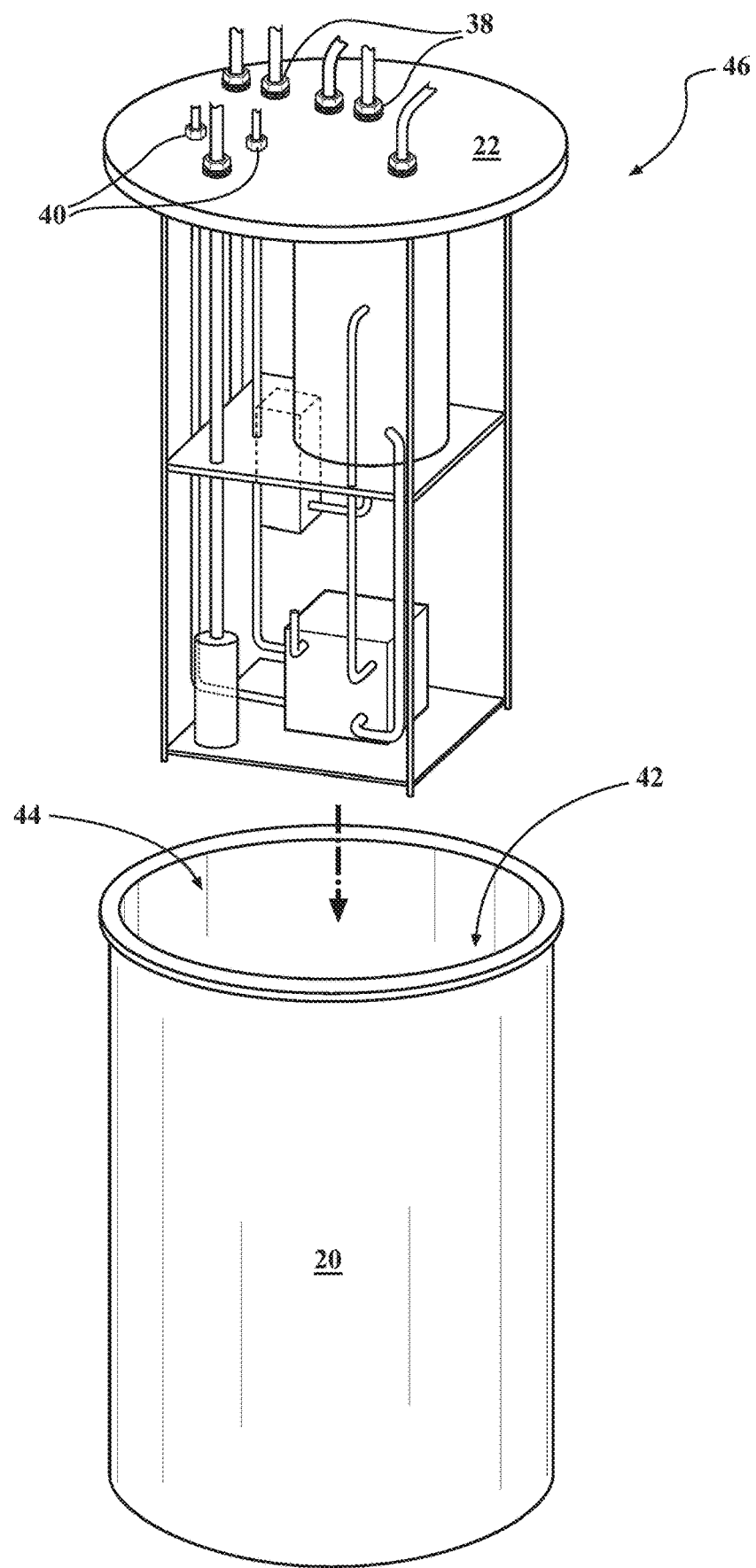
FIG. 2 is a schematic diagram of a hydrogen generation system including a high-pressure containment vessel and a hydrogen generation insert in accordance with one embodiment.

Referring now to FIG. 2, one embodiment of the system 10 is modular, and includes the high-pressure containment vessel 20 and a hydrogen generation insert 46. The hydrogen generation insert 46 is shaped for insertion into the hydrogen plenum 42. Just as previously described, the high-pressure containment vessel 20 has a sidewall and a floor. The high-pressure containment vessel 20 defines the opening 44 opposite the floor with the hydrogen plenum 42 therebetween.

Figure 3:
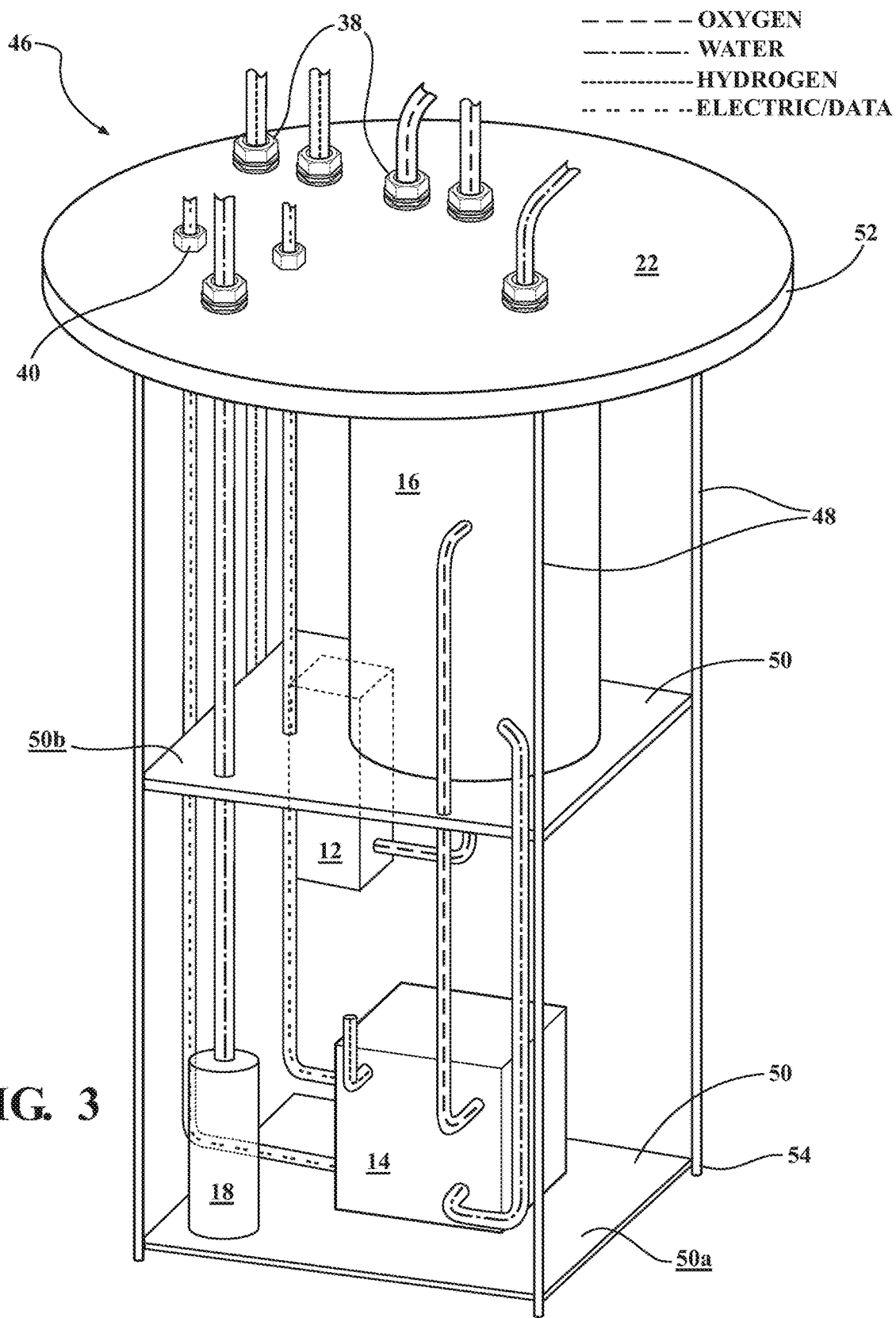
FIG. 3 is an isolated view of the hydrogen generation insert of the hydrogen generation system of FIG. 2.

Referring now to FIG. 3, the hydrogen generation insert 46 has a first end 52 and a second end 54 and is shaped to be inserted through the opening 44 and into the hydrogen plenum 42. The hydrogen generation insert 46 includes the cover 22, as previously described. The cover 22 at the first end 52 of the hydrogen generation insert 46 defines an upper and a lower surface and having the plurality of high-pressure fittings 38 thereon. The hydrogen generation insert 46 includes the one or more PEM cells 14, the oxygen-water separator 16, and the regulator 12. The hydrogen generation insert 46 can be inserted into the hydrogen plenum 42 to produce hydrogen and oxygen at an interior pressure of from 200 to 6,000 or 200 to 5,000 psi.

In some embodiments, the hydrogen generation insert 46 includes one or more shelves 50 coupled to the one or more extensions 48. Each of the one or more shelves 50 present a support surface substantially parallel to the upper surface of the cover 22. In the embodiment illustrated, the hydrogen generation insert 46 includes four extensions coupled to the cover 22 and extending to the second end of the hydrogen generation insert 46, a lower shelf 50a coupled to the four supports at the second end 54 of the hydrogen generation insert 46, and a central shelf 50*b* coupled to the four supports between the first and the second ends 52, 54 of the hydrogen generation insert 46.

In some embodiments, the hydrogen generation insert 46 includes one or more extensions 48 coupled to the cover 22 and extending towards the second end 54 of the hydrogen generation insert 46. In the embodiment illustrated, the hydrogen generation insert 46 includes four extensions. In one non-limiting example, one or more extensions 48 comprise ⅜" stainless steel threaded rods that are suspended from the cover 22 to support one or more shelves 50 comprising aluminum plates.

In the embodiment illustrated, the oxygen-water separator 16 is positioned on the support surface of the central shelf 50*b* and the one or more PEM cells 14 are positioned on the support surface of the lower shelf 50*a* to allow for gravity feeding of water from the oxygen-water separator 16 to the one or more PEM cells 14.

The float valve 18 is also positioned on the support surface of the lower shelf 50*a*. As described previously, water that is released from the one or more PEM cells 14 during operation is collected in a portion of the hydrogen plenum 42 proximal the floor of the high-pressure containment vessel 20 to cool the one or more PEM cells 14. This water is removed from the portion of the hydrogen plenum 42 once the water collected exceeds a certain level.

The hydrogen generation insert 46 includes a fluidic and electronic infrastructure that allows for the import and export of fluids and power to the hydrogen plenum 42 from the system 10 when the hydrogen generation insert 46 is received in the hydrogen plenum 42 and the cover 22 is coupled to the first end of the high-pressure containment vessel 20. An internal water feed line extends from one of the plurality of high-pressure fitting on the cover 22 to the oxygen-water separator 16. The exterior water supply tank 24 is coupled to one of the plurality of high-pressure fitting to provide the oxygen-water separator 16 with water. In the embodiment illustrated, the two high pressure power lines extend from two of the high-pressure couplings 40 on the cover 22 to supply the one or more PEM cells 14 with electricity. The power source 31 is in electric communication with the two high-pressure couplings to provide electricity. There is also a water supply line and oxygen line that extends between the oxygen-water separator 16 and the one or more PEM cells 14. An oxygen feed line extends between the oxygen-water separator 16 and the regulator 12.

It should be appreciated that the system 10 can be in electric communication with the power source and a controller. The controller can be used to collect and interpret data from sensors within the hydrogen plenum as well as from controllers associated with system 10 components outside of the hydrogen plenum. The controller can also be used to control various system components inside and outside of the hydrogen plenum.

The hydrogen output line 74 and a hydrogen vent line 76 extend between the regulator 12 and two of the plurality of high-pressure fitting of the cover 22. An oxygen output line 80 and an oxygen vent line 82 extend between the regulator 12 and two more of the plurality of high-pressure fitting of the cover 22. In some embodiments, the hydrogen vent line and the oxygen vent line are pressure rated and simply connected to vent ports on the cover 22.

Figure 31:
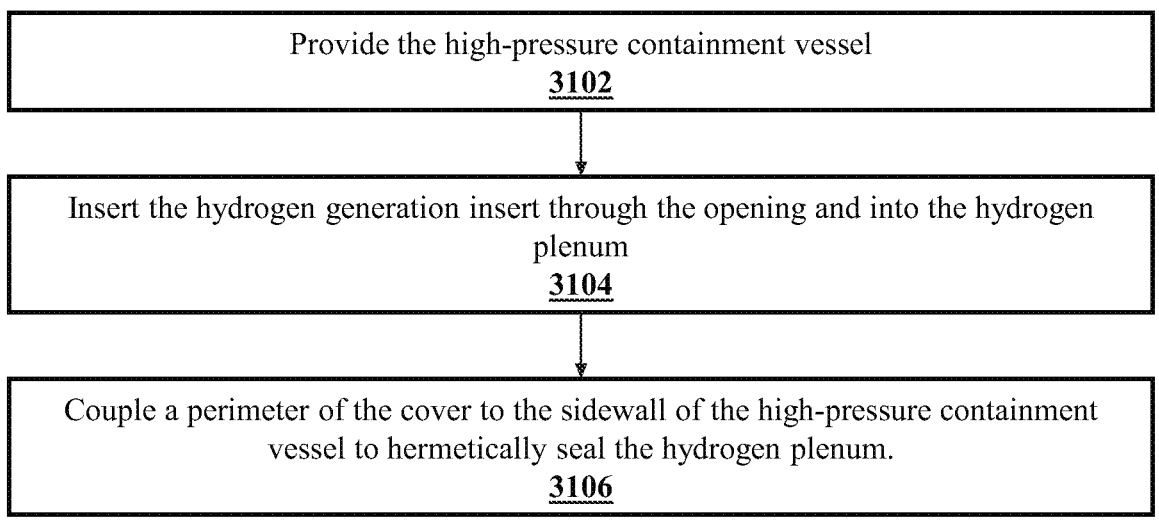
FIG. 31 is a flow chart detailing a method of assembling the hydrogen generation system of FIG. 2.

Referring now to FIG. 31, a method (3100) of assembling the system 10 is disclosed. The method includes the steps of: providing the high-pressure containment vessel 20 (3102); inserting the hydrogen generation insert 46 through the opening 44 and into the hydrogen plenum 42 (3104); and coupling a perimeter of the cover 22 to the sidewall of the high-pressure containment vessel 20 to hermetically seal the hydrogen plenum 42 (3106). Once the hydrogen generation insert 46 is received in the high-pressure containment vessel 20 and the cover 22 fastened to the high-pressure containment vessel 20 to hermetically seal the hydrogen plenum 42, the power source 31 can be connected with one of the one more high-pressure couplings 40 in the cover 22. The system (e.g., insert) can comprise one or more power and/or communication conduits extending from the one or more high-pressure electric couplings to the one or more PEM cells. The exterior hydrogen storage vessel 28 is then coupled to a first high-pressure fitting in the cover 22 and the exterior oxygen storage vessel 26 is coupled to a second high-pressure fitting in the cover 22. The exterior water supply tank 24 is coupled to a third high-pressure fitting in the cover 22 with a water supply line including the water booster 32. The water booster 32 is then connected to the exterior oxygen storage vessel 26. Finally, the exterior water supply tank 24 is connected to a hydrogen booster on a hydrogen supply line 87 of the exterior hydrogen storage vessel 28.

Figure 13:
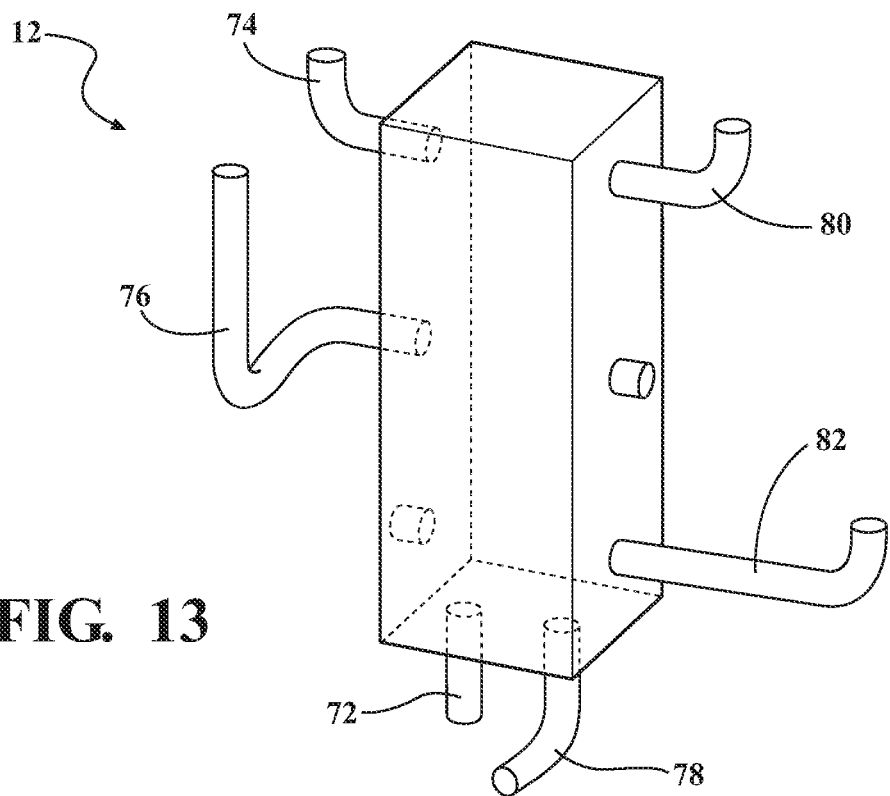
FIG. 13 illustrates a front view of an embodiment of a passive dual modulating regulator with relative differential venting for use with the hydrogen generation system of FIG. 1.
Figure 14:
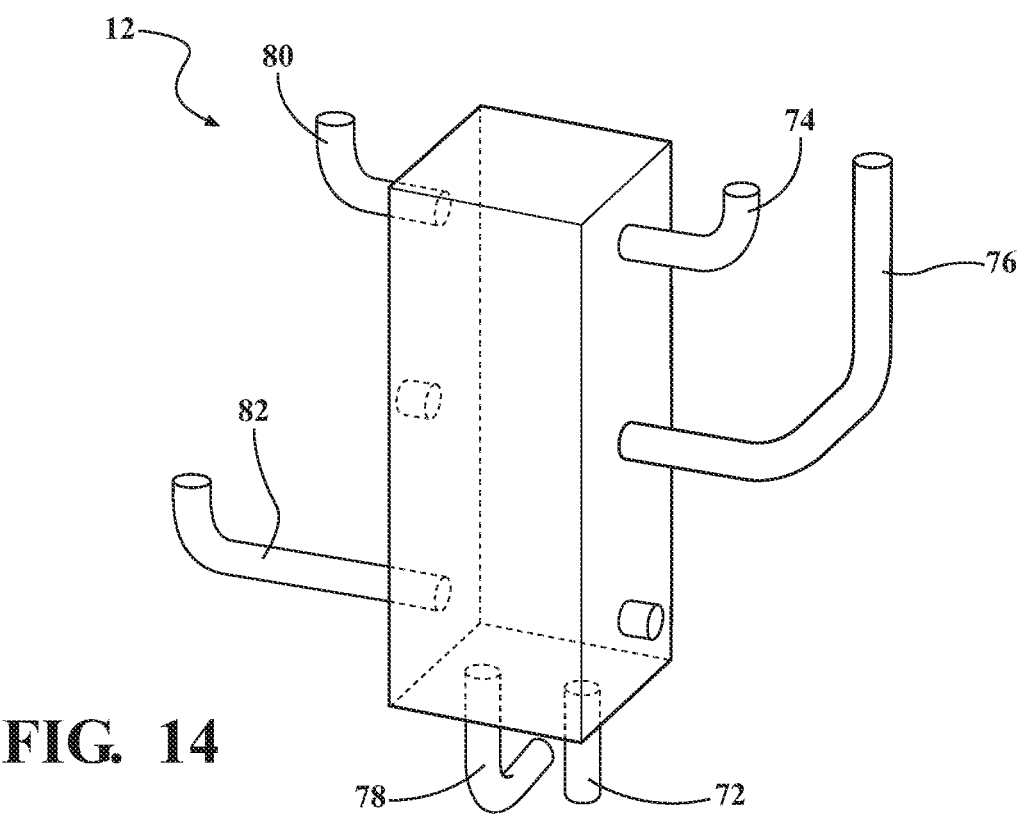
FIG. 14 illustrates a back view of a passive dual modulating regulator with relative differential venting for use with the hydrogen generation system of FIG. 1.

Referring now to FIGS. 13-18, an embodiment of the passive dual modulating regulator with relative differential venting, the regulator 12, is illustrated. Referring to FIGS. 13 and 14, hydrogen flow into and out of the regulator 12 is illustrated. FIG. 13 illustrates a front view of an embodiment of the regulator 12. FIG. 14 illustrates a back view of the regulator 12 of FIG. 13. The hydrogen input line 72 feeds hydrogen to the regulator 12 from the hydrogen plenum 42. The hydrogen output line 74 and the hydrogen vent line 76 extend between the regulator 12 and two of the plurality of high-pressure fittings 38 of the cover 22. The oxygen input line 78 feeds oxygen to the regulator 12 from the oxygen-water separator 16. The oxygen output line 80 and the oxygen vent line 82 extend between the regulator 12 and two of the plurality of high-pressure fittings 38 of the cover 22. In some embodiments, the hydrogen vent line and the oxygen vent line are pressure rated and simply connected to vent ports on the cover 22.

The regulator 12 comprises a first housing section 84 and a second housing 86 section and has a first end and a second end. FIG. 15 illustrates a front perspective view of an embodiment of the housing section of the regulator 12 and FIG. 16 illustrates a back perspective view of the housing section of FIG. 15. In this example, the first and second housing sections 84, 86 have the same shape. In this embodiment, the first housing section 84 defines a first, second, and third cavity, with each cavity opposing hydrogen and oxygen chambers opposing one another and separated by the flexible diaphragm 120. The chambers can be any shape, but in the embodiments illustrated the first housing section 84 defines a first, second, and third cavity, with each cavity having a spherical shape and the respective hydrogen and oxygen hemispherical chambers opposing one another and separated by the flexible diaphragm 120. The first, second, and third valve assemblies 126, 128, 130 are disposed in the three cavities. It should be appreciated that the shape of the three cavities can vary. It also should be appreciated that the order of the valve assemblies can vary. For example, FIGS. 17 and 18 include the first, second, and third valve assemblies 126, 128, 130 in the three cavities in order starting at from a first end of the regulator 12. This order can be reversed, for example the first, second, and third valve assemblies 126, 128, 130 in the three cavities in order starting at from a second end of the regulator 12. Further, the first, second, and third valve assemblies 126, 128, 130 could be arranged in a different order, e.g., the second, first, and third valve assemblies 128, 126, 130 in order from either end of the regulator 12.

In this embodiment, the first housing section 84 defines a first, second, and third hydrogen chamber 88, 90, 92. The first housing section 84 also defines a hydrogen inlet port 100, a hydrogen outlet port 102, and a hydrogen vent port 104. Hydrogen channels 108 extend between the inlet port, the first hydrogen chamber 88, the first and second hydrogen chambers 88, 90, and the second and third hydrogen chambers 90, 92. The first hydrogen chamber 88, the second hydrogen chamber 90, the third hydrogen chamber 92, the hydrogen inlet port 100, the hydrogen outlet port 102, the hydrogen vent port 104, and the three hydrogen channels 108 cooperate to define a hydrogen fluid path. In this embodiment, the hydrogen gas inlet is defined by the first housing section 84 at the first end of the regulator 12. The hydrogen outlet port extends through the body of the first housing section 84 to the first hydrogen chamber. The hydrogen vent port extends through the body of the first housing section 84 to the second hydrogen chamber. In this embodiment, the first housing section 84 also defines a first access port 117 that extends to the third hydrogen chamber 92.

In this embodiment, the second housing section 86 defines a first, second, and third oxygen chamber 94, 96, 98. The second housing section 86 defines an oxygen inlet port 110, an oxygen outlet port 112, and an oxygen vent port 114. Oxygen channels 116 extend between the oxygen inlet port 110 and the first oxygen chamber 94, the first and second oxygen chamber, 88, 90, and the second and third oxygen chambers 96, 98. The first oxygen chamber 94, the second oxygen chamber 96, the third oxygen chamber 98, the oxygen inlet port 110, the oxygen outlet port 112, the oxygen vent port 114, and the three oxygen channels 116 cooperate to define an oxygen fluid path. In this embodiment, the oxygen gas inlet is defined by the second housing section 86 at the first end of the regulator 12. The oxygen outlet port extends through the body of the second housing section 86 to the first oxygen chamber. The oxygen vent port extends through the body of the second housing section 86 to the third oxygen chamber. In this embodiment the second housing section 86 also defines a second access port 118 that extends to the second oxygen chamber. When the regulator 12 is assembled, the first access port 117 is opposite the hydrogen vent port 104 and the second access port 118 is opposite the oxygen vent port 114.

It should be appreciated that the shape of the input ports, venting ports, and access ports, can vary. It also should be appreciated that the location of the input ports, venting ports, and access ports can vary.

Figure 17:
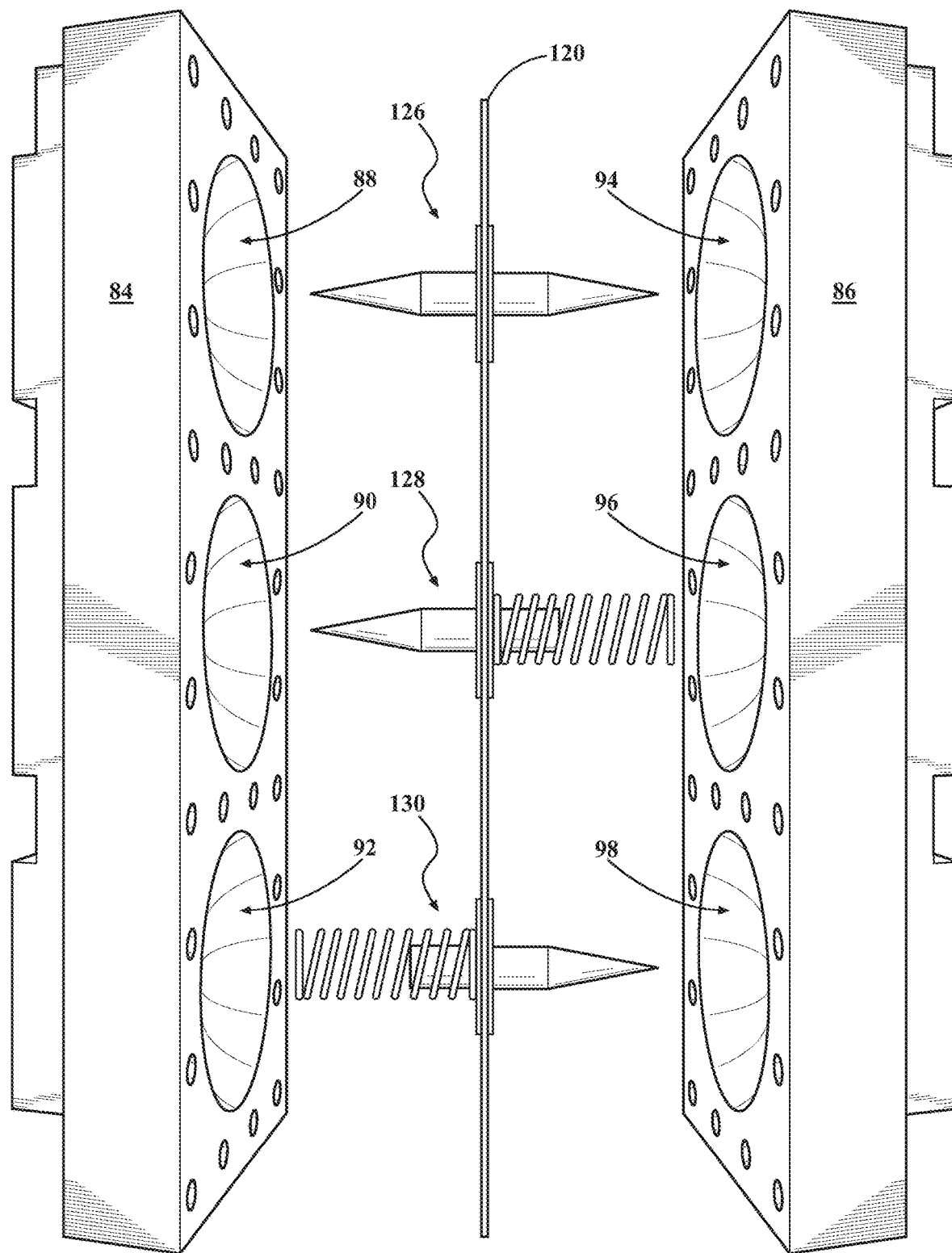
FIG. 17 is an exploded view of a passive dual modulating regulator with relative differential venting for use with the system of FIG. 1.

In the embodiment illustrated, with reference to FIGS. 15, 16, and 17, the first housing section 84 and the second housing section 86 are chiral and thus interchangeable. That is, the first housing section 84 and the second housing section 86 are dimensionally the same, which makes manufacturing and assembly more efficient. Further, in the embodiment illustrated, the hydrogen gas inlet, the oxygen gas inlet, the hydrogen outlet port, the oxygen outlet port, the hydrogen vent port, and the oxygen vent port have a common diameter and are defined by a threaded surface. Of course, this chirality and commonality affords design flexibility with respect to positioning the three valves.

When assembled, the flexible diaphragm 120 having a first side 122 and a second side 124 is clamped between the first housing section 84 and the second housing section 86. A series of bolt openings about the periphery of the flexible diaphragm 120 are in alignment with bolt openings in the first and second housing sections. The flexible diaphragm 120 is typically formed from gas-impermeable polymeric composition. In one embodiment, the flexible diaphragm 120 comprises a sulfonated tetrafluoroethylene-based fluoropolymer-copolymer. In other embodiments, the flexible diaphragm 120 comprises silicone or another elastomer. A thickness of the flexible diaphragm 120 can be adjusted to modify the flexibility/sensitivity of the flexible diaphragm 120. The flexible diaphragm 120 includes a first, second, and third central aperture to accommodate the first, second, and third valve assembly 126, 128, 130, respectively.

The first housing section 84 and the second housing section 86 cooperate to define a first internal cavity having a spherical shape, which comprises the first hydrogen chamber 88 and the first oxygen chamber 94 with the flexible diaphragm 120 therebetween. The first valve assembly 126 is disposed in the first internal cavity.

The first housing section 84 and the second housing section 86 cooperate to define a second internal cavity having a spherical shape and comprising the second hydrogen chamber 90 and the second oxygen chamber 96 with the flexible diaphragm 120 therebetween. The second valve assembly 128 is disposed in the second internal cavity.

The first housing section 84 and the second housing section 86 cooperate to define a third internal cavity having a spherical shape and comprising the third hydrogen chamber 92 and the third oxygen chamber 98 with the flexible diaphragm 120 therebetween. The third valve assembly 130 is disposed in the third internal cavity.

Referring now to the exploded view of FIG. 17, the first hydrogen chamber 88 having a hemispherical shape is positioned on the first side of the flexible diaphragm 120 and a first hemispherical oxygen chamber 94 having a hemispherical shape is positioned on the second side of the flexible diaphragm 120 within the first internal cavity. The first valve assembly 126 extends through the flexible diaphragm 120 and includes a first valve pin 134 in alignment with a first valve seat in the first housing section 84 and includes a second valve pin 148 in alignment with a second valve seat in the second housing section 86. A pressure differential between the first hemispherical hydrogen chamber 88 and the first hemispherical oxygen chamber 94 causes the flexible diaphragm 120 to deflect toward a region of lesser pressure, such that the first valve assembly 126 restricts and then seals the hydrogen outlet port 102 of the first hemispherical hydrogen chamber or the oxygen outlet port 112 of the first hemispherical oxygen chamber to equalize pressure within the first hemispherical hydrogen chamber and the first hemispherical oxygen chamber. Because the flexible diaphragm 120 is sensitive to even small pressure differentials, the high-pressure side pushes the flexible diaphragm 120 towards the low-pressure side to close off the outlet port of the low-pressure side. The pressure on the low-pressure side will slowly build due to the outlet port being closed while gas is continuously generated at the PEM cells. As the pressure equalizes, the outlet port gradually opens. Consequently, a thin polymer membrane within each PEM cell is balanced on each side, preventing a rupture of the thin polymer electrolyte membrane.

Figure 18:
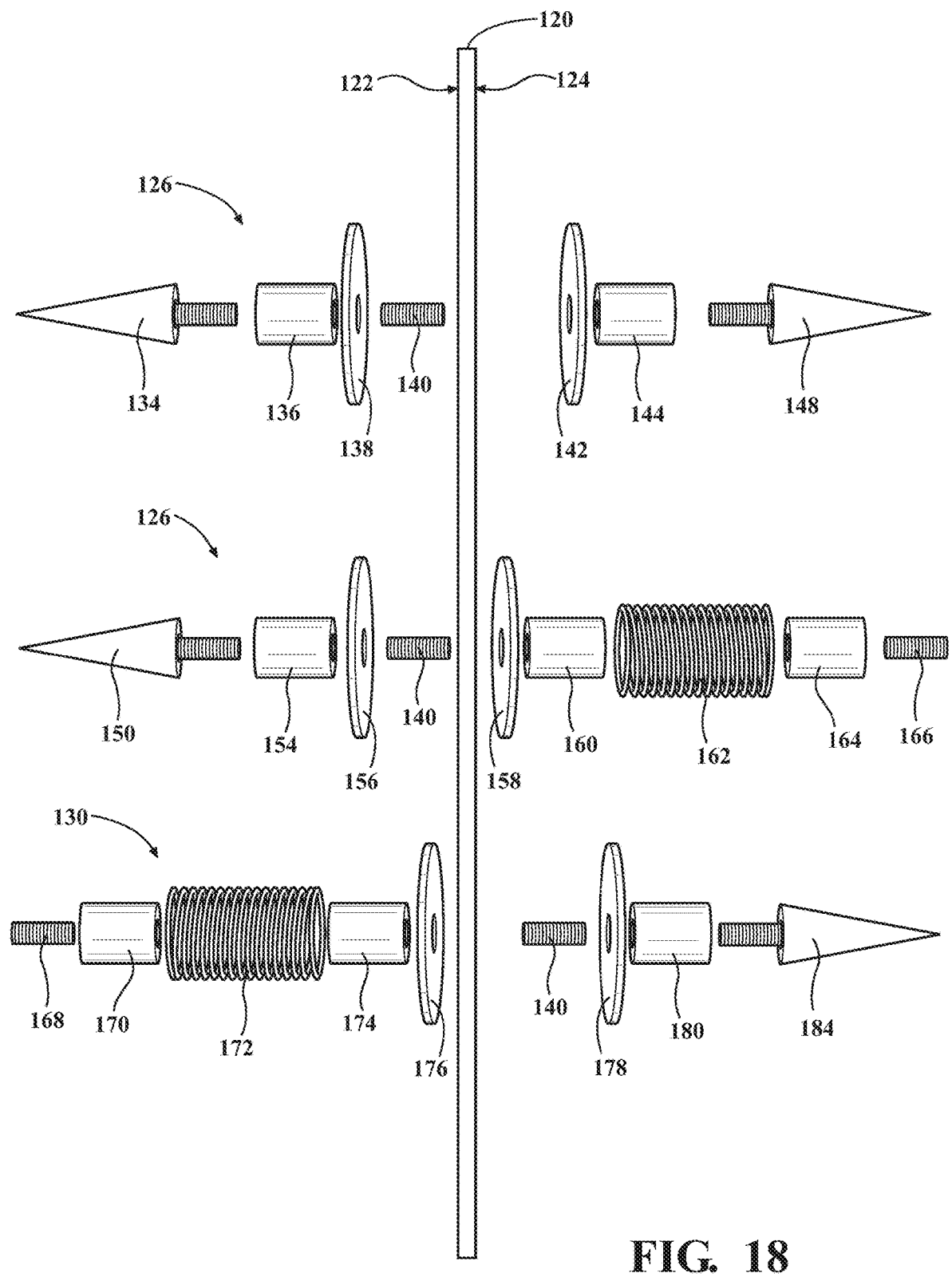
FIG. 18 is an isolated, exploded view of a flexible diaphragm, a first valve assembly, a second, valve assembly, and a third valve assembly of the passive dual modulating regulator with relative differential venting of FIG. 17.

Referring now to the exploded view of FIG. 18, the first valve assembly 126 includes: first valve pin 134 extending from the first valve base 136; and a second valve pin 148 extending from the second valve base 144. The first valve pin 134 comprises the first valve base 136 and the second valve pin comprises the second valve base 144. The first valve assembly 126 also includes a first fender washer 138 on the first side of the flexible diaphragm 120 and a second fender washer 142 on the second side of the flexible diaphragm 120. The first valve assembly 126 extends through a first central aperture in the flexible diaphragm 120 for selectively closing the hydrogen and oxygen outlet ports of the first hemispherical hydrogen chamber and the first hemispherical oxygen chamber. Opposing ends of the first valve assembly 126 are joined together by a headless screw 140a and include a first and a second valve pin, a first and a second valve base, and a first and a second fender washer, respectively. The valve pins are externally threaded at one end for attachment to the valve bases. The valve bases are internally threaded at a distal end for attachment to the valve pin and internally threaded at a proximal end for attachment to the headless screw, which joins each side of the first valve assembly 126 together.

As pressure in the one or more PEM cells 14 grows, hydrogen and oxygen enter begin to fill the hydrogen plenum 42 and oxygen-side of the system 10, but with twice as much hydrogen produced as oxygen. Because the flexible diaphragm 120 is sensitive to even small pressure differentials, the hydrogen-side pushes the flexible diaphragm 120 towards the oxygen-side to close off the oxygen outlet port while allowing hydrogen gas to pass through the hydrogen outlet port and into the exterior hydrogen storage vessel. The pressure on the oxygen-side will slowly build (to match the pressure on the hydrogen-side) due to the oxygen outlet port being closed while oxygen is continuously generated by the one or more PEM cells 14. As the pressure on the oxygen-side reaches the pressure on the hydrogen-side, the valve assembly centers, and gas flow is allowed at each outlet port. The thin polymer membranes within each PEM cell are balanced on either side, preventing a rupture of the membrane.

A second hemispherical hydrogen chamber having a hemispherical shape is in fluid communication with the first hemispherical hydrogen chamber positioned on the first side of the flexible diaphragm 120 and a second hemispherical oxygen chamber in fluid communication with the first hemispherical oxygen chamber is positioned on the second side of the flexible diaphragm 120. The second valve assembly 128 extends through the flexible diaphragm 120 and includes a third valve pin 150 seated in a third valve seat in the second hemispherical hydrogen chamber 90 and includes a first biasing element 162 in the second hemispherical oxygen chamber 96 biasing the third valve pin into the third valve seat, wherein a threshold pressure differential between the second hemispherical hydrogen chamber and the second hemispherical oxygen chamber due to excess pressure in the second hemispherical hydrogen chamber causes the flexible diaphragm 120 to overcome the first biasing element and deflect toward a region of lesser pressure in the second hemispherical oxygen chamber to open the second valve assembly 128 to release hydrogen through the hydrogen vent port.

Various embodiments of regulator are described in the subject disclosure and illustrated in accompanying drawings. The embodiments of the regulator described, e.g., regulator 12, regulator 212 include a biasing element, e.g., a spring. It should be appreciated that the biasing element is not limited to a spring and can be an elastic band, a torsion bar, a leaf spring, a gas spring, an air spring, a Bellville washer, a wave spring, or another type of biasing element known in the art.

The second valve assembly 128 includes a third valve pin 150 extending from the third valve base 154 and a first mounting rod 160 opposite the third valve pin 150. The first mounting rod 160 has the first biasing element 162 disposed thereon. Opposing ends of the second valve assembly 128 are joined together by a headless screw 140b. One end of the second valve assembly 128 includes a third valve pin 150, a third valve base 154, and a third fender washer 156, the other end includes a fourth fender washer 158 and a first mounting rod 160 shaped to be received by a distal end of the first biasing element 162. The second valve assembly 128 includes the third fender washer 156 on the first side of the flexible diaphragm 120 and the fourth fender washer 158 on the second side of the flexible diaphragm 120. The first access port 117 in the second housing section 86 is opposite the hydrogen vent port 104 in the first housing section 84. The first access port 117 is defined by a threaded surface and has a common diameter with the hydrogen vent port. A first insert 166 has a threaded exterior wall, a first end and a second end. The first end has a second mounting rod 164 threaded thereon and is shaped to be received by a distal end of the first biasing element 162. The first insert 166 is rotatably received in the first access port 117 and can be rotated in or out with an access element (e.g., a notch for a screwdriver or the like) on the second end of the first insert 166. Rotating the first insert 166 in and out of the first access port 117 allows for adjustment of a threshold pressure differential by increasing or decreasing the biasing force of the first biasing element 162.

A third hemispherical hydrogen chamber 92 having a hemispherical shape is in fluid communication with the second hemispherical hydrogen chamber 90 positioned on the first side of the flexible diaphragm 120 and a third hemispherical oxygen chamber in fluid communication with the second hemispherical oxygen chamber is positioned on the second side of the flexible diaphragm 120. The third valve assembly 130 extends through the flexible diaphragm 120 and includes a fourth valve pin 184 seated in a fourth valve seat in the third hemispherical oxygen chamber and includes a second biasing element in the third hemispherical hydrogen chamber biasing the fourth valve pin into the fourth valve seat, wherein a threshold pressure differential between the third hemispherical hydrogen chamber and the third hemispherical oxygen chamber due to excess pressure in the third hemispherical oxygen chamber causes the flexible diaphragm 120 to overcome the second biasing element and deflect toward a region of lesser pressure in the third hemispherical hydrogen chamber to open the third valve assembly 130 to release oxygen through the oxygen vent port.

The third valve assembly 130 includes a third mounting rod 174 and a fourth valve pin 184 extending from the fourth valve base 180 and opposite the third mounting rod 174. The third mounting rod 174 has the second biasing element 172 disposed thereon. Opposing ends of the third valve assembly 130 are joined together by a headless screw 140. One end of the second valve assembly 128 includes a fifth fender washer 176 and a third mounting rod 174 shaped to be received by a distal end of the second biasing element 172 and the other end includes a fourth valve pin 184, a fourth valve base 180, and a sixth fender washer 178. The third valve assembly 130 includes the fifth fender washer 176 on the first side of the flexible diaphragm 120 and the sixth fender washer 178 on the second side of the flexible diaphragm 120. The second access port 118 in the first housing section 84 is opposite the oxygen vent port 114 in the second housing section 86. The second access port 118 is defined by a threaded surface and has a common diameter with the oxygen vent port. A second insert 168 has a threaded exterior wall, a first end and a second end. The first end has a fourth mounting 170 rod threaded thereon and is shaped to be received by a distal end of the second biasing element. The second insert 168 is rotatably received in the second access port 118 and can rotated in or out with an access element (e.g., a notch for a screwdriver or the like) on the second end of the second insert. Rotating the second insert in and out of the second access port 118 allows for adjustment of a threshold pressure differential by increasing or decreasing the biasing force of the second biasing element.

The first and the second biasing elements 162, 172, e.g., first and second springs, have a spring rate. The spring rate can be adjusted to adjust the pressure differential threshold. In some embodiments, the pressure differential threshold is between, 5 and 500, 5 and 150, and 5 and 75 psi. In one, non-limiting embodiment, when a pressure differential between the second hemispherical hydrogen chamber 90 and the second hemispherical oxygen chamber 96 exceeds 15 psi, the first biasing element 162 is overcome, and the second valve assembly 128 opens to release hydrogen out of the hydrogen vent port 104. In one embodiment, when a pressure differential between the third hemispherical hydrogen chamber and the third hemispherical oxygen chamber exceeds 15 psi, then the second biasing element is overcome, and the third valve assembly 130 opens to release oxygen out of the oxygen vent port 114.

As described above, the flexible diaphragm 120 interacts with the first, second, and third valve assemblies 126, 128, 130. It should be appreciated that the valve closure hardware on each end of the first valve assembly and the valve closure hardware of the second and third valve assemblies (which is illustrated as a high-pressure needle/pin valve) can vary. Various high pressure valve closure configurations known in the art can be used as an alternate to the needle valves illustrated. Other changes, such as a single piece valve pin (where the base and the pin are unitary) are contemplated herein. Likewise, various changes can be made to the biasing hardware that is used to support the first and the second biasing elements. The regulator 12 is not limited to the valve assemblies of FIGS. 13-18 and can include other configurations as desired. For example, various valve design features disclosed in U.S. Pat. No. 11,500,401, which is incorporated herein in its entirety, could be employed for use in the regulator 12. Of course, the components of the valve assemblies disclosed in U.S. Pat. No. 11,500,401, could be modified (e.g., made with metal rather than rubber/elastomer) to support the system 10, which operates at high pressure, disclosed herein.

In some embodiments, a regulator 212 comprises a housing, a first piston valve, a second piston valve, and a third piston valve. The regulator 212 defines a hydrogen fluid path in fluid communication with the hydrogen plenum, an exterior hydrogen storage vessel, and an exterior of the high-pressure containment vessel as well as an oxygen fluid path in fluid communication with the oxygen-water separator, an exterior oxygen storage vessel, and an exterior of the high-pressure containment vessel. The regulator regulates pressure imbalances between an oxygen-side of the system and a hydrogen-side of the system, and vents oxygen and hydrogen to an exterior of the high-pressure containment vessel to allow collection of both hydrogen and oxygen and avoid rupture of a PEM in the one or more PEM cells.

Figure 19:
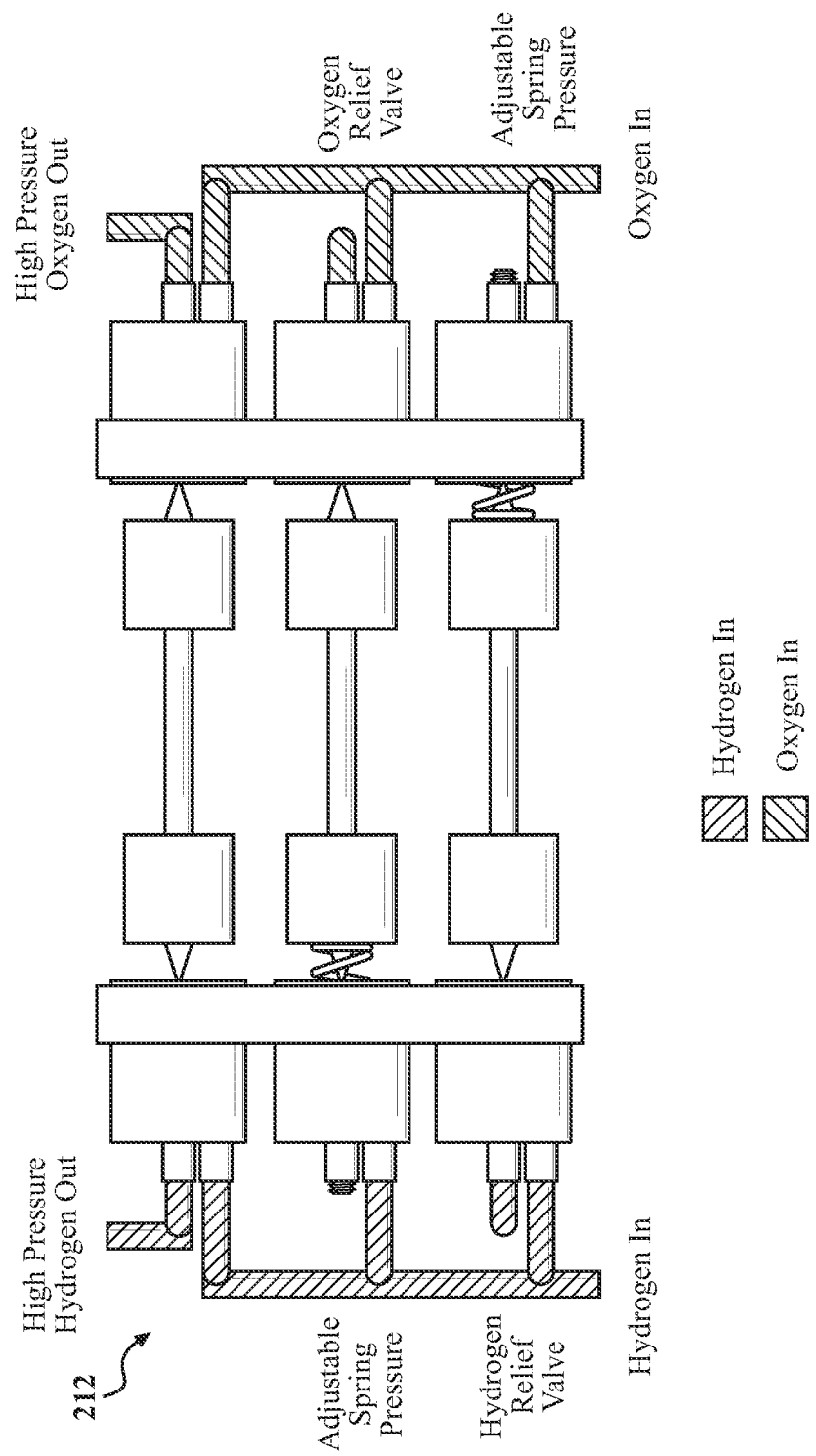
FIG. 19 illustrates a schematic front view of an embodiment of a passive dual modulating regulator with relative differential venting for use with the hydrogen generation system disclosed herein.
Figure 20:
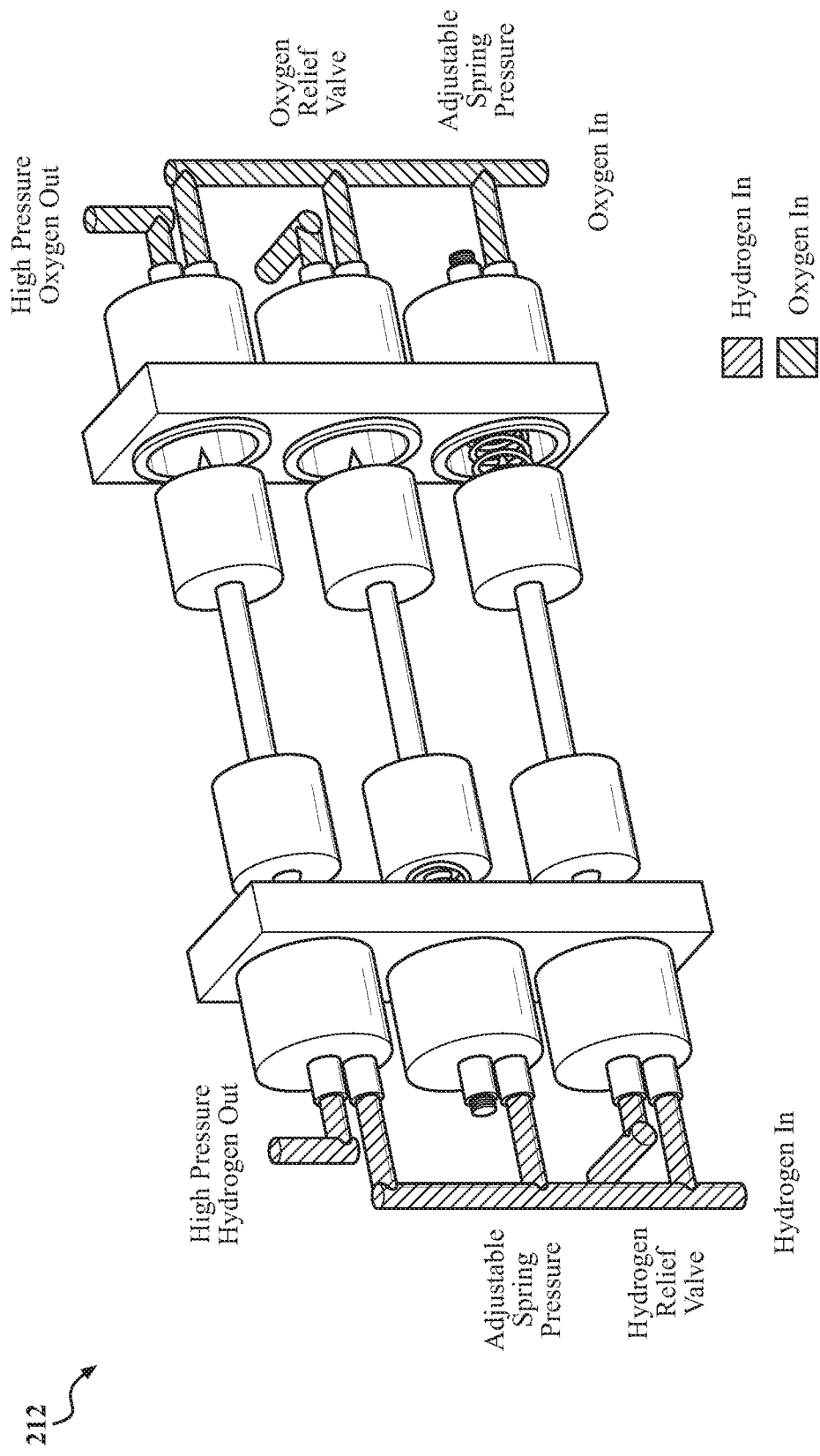
FIG. 20 is a perspective side view of the passive dual modulating regulator with relative differential venting of FIG. 19.

Referring now to FIGS. 19-29, the passive dual modulating regulator with relative differential venting in accordance with another exemplary embodiment is illustrated. Referring to FIGS. 19 and 20, hydrogen flow into and out of the regulator 212 is illustrated. FIG. 19 illustrates a schematic front view of this embodiment of the regulator 212 and FIG. 20 is a perspective side view of the regulator 212 of FIG. 19.

Figure 21:
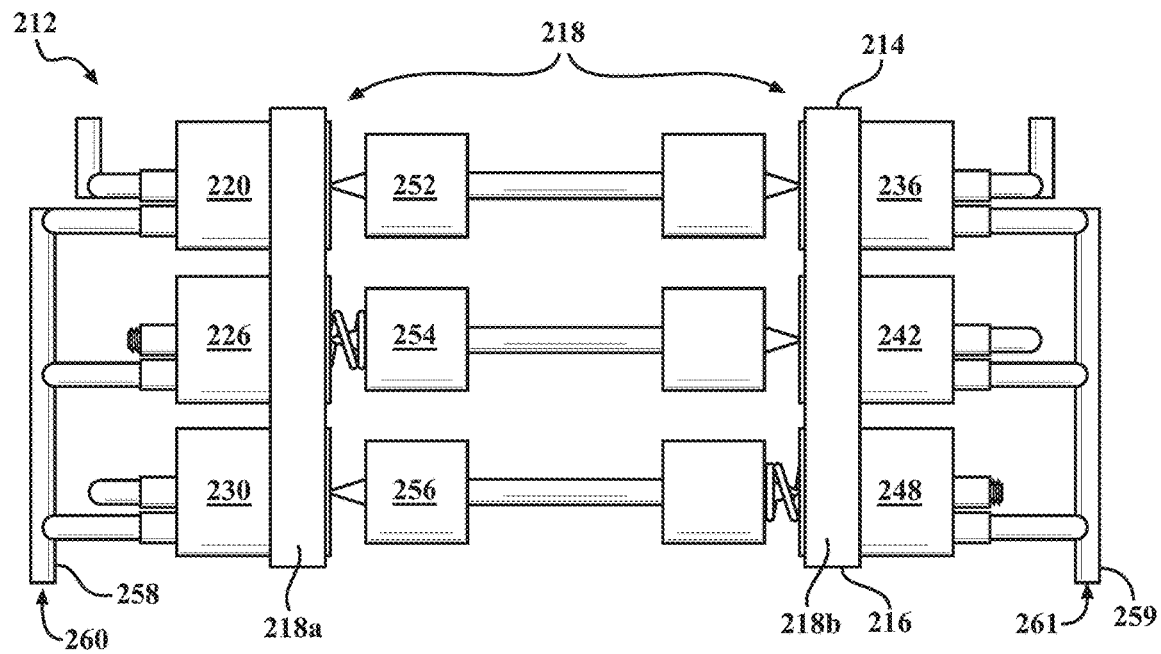
FIG. 21 is a partially exploded perspective side view of the passive dual modulating regulator with relative differential venting of FIG. 19.
Figure 22:
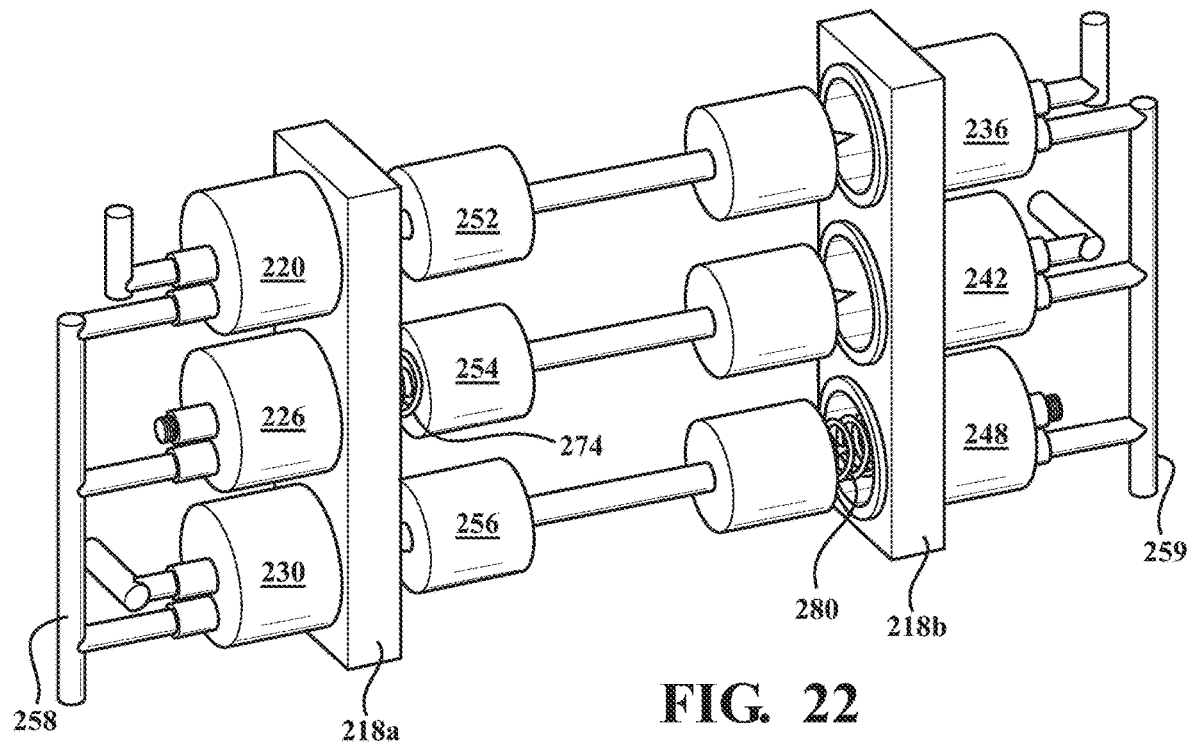
FIG. 22 is a perspective side view of the passive dual modulating regulator with relative differential venting of FIG. 21.

Referring now to the exploded view of FIGS. 21 and 22, the regulator 212 has a first end 214 and a second end 216 and comprises a housing 218. The housing 218 includes a first housing section 218a having a first hydrogen cylinder 220 defining a first hydrogen chamber 222 and hydrogen output port 224, a second hydrogen cylinder 226 defining a second hydrogen chamber 228, and a third hydrogen cylinder 230 defining a third hydrogen chamber 232 and a hydrogen vent port 234. The housing 218 also includes a second housing section 218b having a first oxygen cylinder 236 defining a first oxygen chamber 238 and an oxygen output port 240, a second oxygen cylinder 242 defining a second oxygen chamber 244 and an oxygen vent port 246, and a third oxygen cylinder 248 defining a third oxygen chamber 250.

In the embodiment illustrated, with reference to FIGS. 21 and 22, the first housing section 218a and the second housing section 218b are chiral and thus interchangeable. That is, the first housing section 218a and the second housing section 218b are dimensionally the same, which makes manufacturing and assembly more efficient. Further, in the embodiment illustrated, the hydrogen gas inlet, the oxygen gas inlet, the hydrogen outlet port, the oxygen outlet port, the hydrogen vent port, and the oxygen vent port have a common diameter and are defined by a threaded surface. Of course, this chirality and commonality affords design flexibility with respect to positioning the three piston valves.

Figure 23:
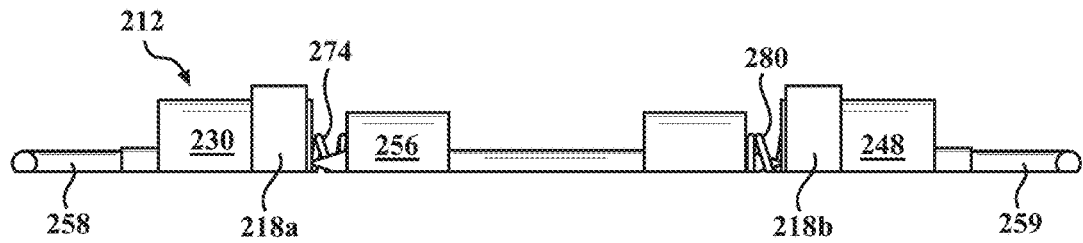
FIG. 23 is cross-sectional side view of the passive dual modulating regulator with relative differential venting of FIG. 19.
Figure 24:
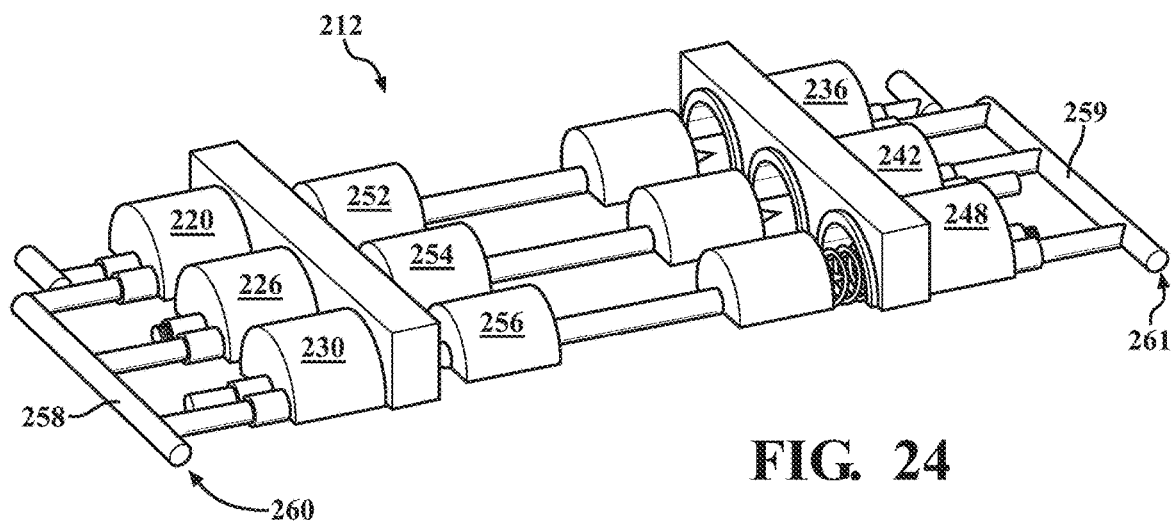
FIG. 24 is a perspective top view of the cross-sectional side view of the passive dual modulating regulator with relative differential venting of FIG. 23.
Figure 25:
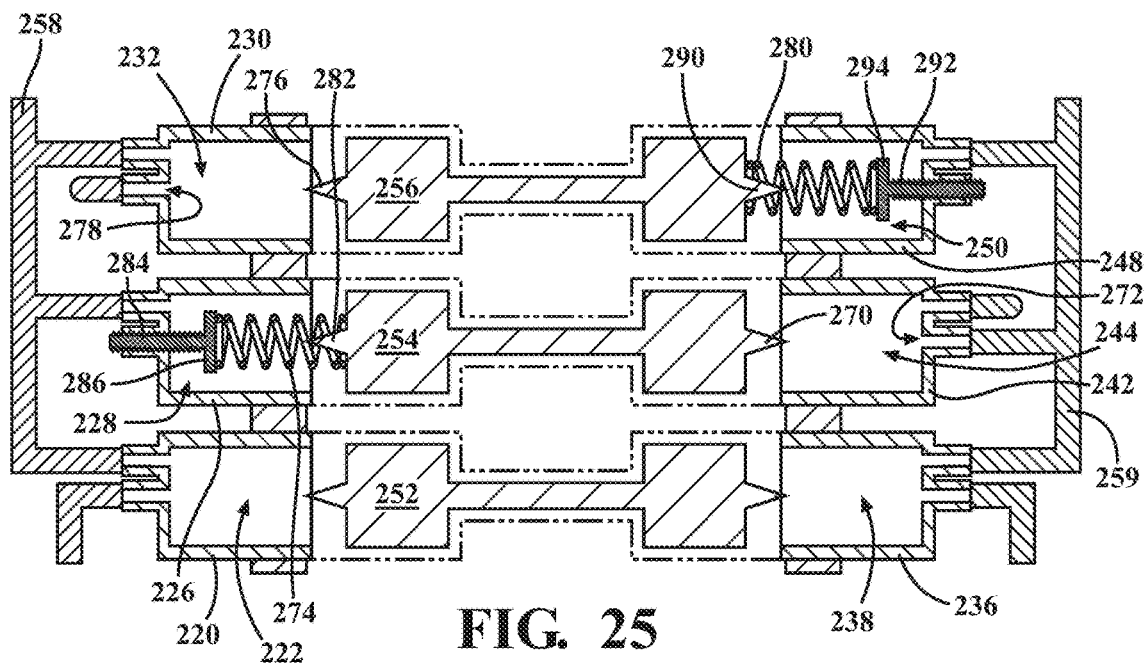
FIG. 25 is a bottom view of the cross-sectional side view of the passive dual modulating regulator with relative differential venting of FIG. 23.

With further reference to FIGS. 23-25, a first piston 252 has a first end and a second end, the first end is slidably engaged in the first hydrogen chamber 222 and the second end is slidably engaged in the first oxygen chamber 238. A second piston 254 has a first end and a second end, the first end is slidably engaged in the second hydrogen chamber 228 and the second end is slidably engaged in the second oxygen chamber 244. A third piston 256 has a first end and a second end, the first end is slidably engaged in the third hydrogen chamber 232 and the second end is slidably engaged in the third oxygen chamber 250.

A hydrogen line 258 is in fluid communication with a hydrogen inlet port 260, the first hydrogen chamber 222, the second hydrogen chamber 228, and the third hydrogen chamber 232. An oxygen line 259 is in fluid communication with an oxygen inlet port 261, the first oxygen chamber 238, the second oxygen chamber 244, and the third oxygen chamber 250.

Figure 28:
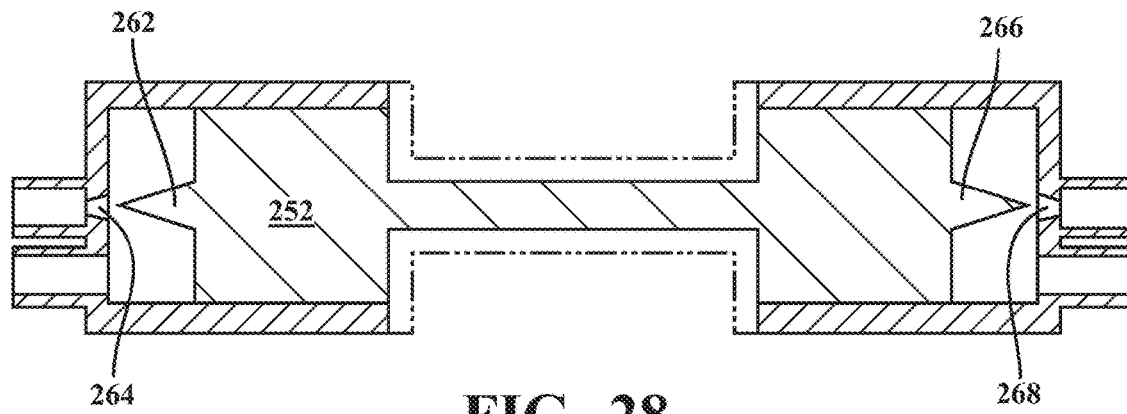
FIG. 28 is a cross-sectional side view of a first piston extending between a first hydrogen cylinder and a first oxygen cylinder and including a first valve pin in alignment with a hydrogen output valve seat in the first hydrogen cylinder and a second valve pin, opposite the first valve pin, in alignment with an oxygen outlet valve seat in the first oxygen cylinder.
Figure 29:
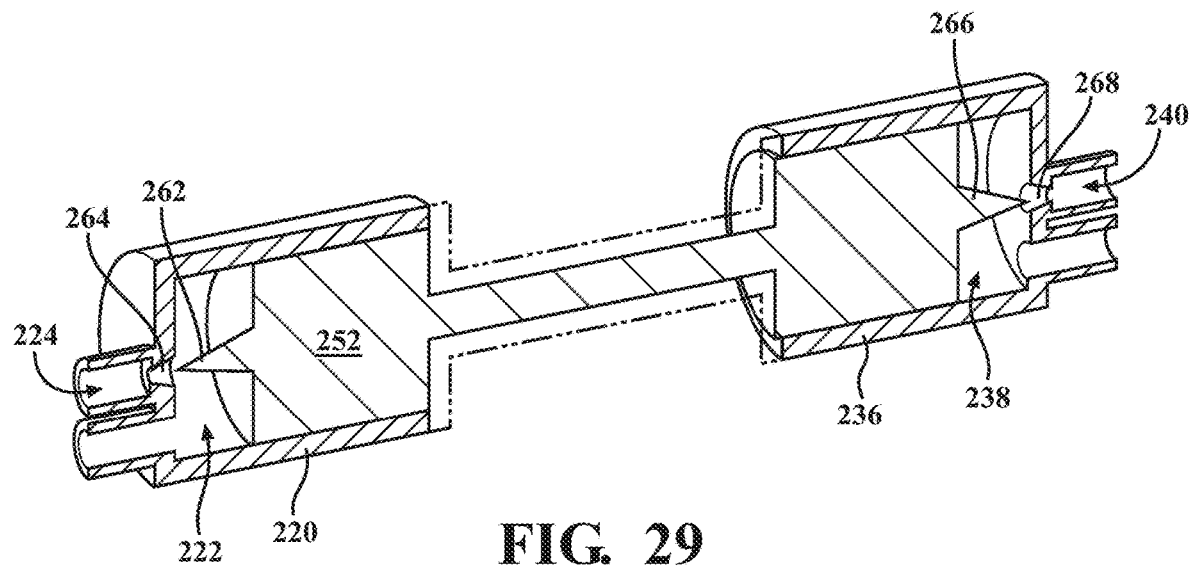
FIG. 29 is a perspective side view of the first piston of FIG. 28.

The first piston 252 extends between the first hydrogen cylinder and the first oxygen cylinder and includes a first valve pin 262 in alignment with a hydrogen output valve seat 264 in the first hydrogen cylinder and includes a second valve pin 266, opposite the first valve pin 262, in alignment with an oxygen outlet valve seat 268 in the first oxygen cylinder, wherein a pressure differential between the first hydrogen chamber and the first oxygen chamber causes the first piston to move towards a region of lesser pressure, such that the piston restricts and then seals the hydrogen outlet port of the first hydrogen chamber or the oxygen outlet port of the first oxygen chamber to equalize pressure within the first hydrogen chamber and the first oxygen chamber. FIG. 28 is a cross-sectional side view of the first piston extending between the first hydrogen cylinder and the first oxygen cylinder and including the first valve pin in alignment with the hydrogen output valve seat in the first hydrogen cylinder and the second valve pin, opposite the first valve pin, in alignment with the oxygen outlet valve seat in the first oxygen cylinder. FIG. 29 is a perspective side view of the first piston of FIG. 28.

The second piston 254 extends between the second hydrogen cylinder 226 and the second oxygen cylinder 242 and includes a third valve pin 270 seated in an oxygen vent valve seat in the second oxygen chamber 244, and a first mounting element 282, opposite the third valve pin 270, in the second hydrogen cylinder 226. A first biasing element 274, mounted on the first mounting element 282 in the second hydrogen chamber 228 biases the third valve pin 270 into the oxygen vent valve seat 272. Referring to FIG. 25, a first access port in the second hydrogen cylinder 226 has a first plug (also referred to as a first insert) 284 disposed therein (e.g., threadedly), which has a mounting feature, e.g., a second mounting element 286 thereon for engaging the first biasing element. As such, the first and second mounting elements 282, 286 are used to position the first biasing element 274 in the second hydrogen chamber 228. As is described for the above embodiment of the regulator 12, this first plug 284 can optionally have a threaded end, which engages the inner surface of the first access port and can be used to adjust the tension on the first biasing element 274 and thus adjust a threshold pressure differential between the second hydrogen chamber 228 and the second oxygen chamber 244. That is in some embodiments, the first plug/insert 284 has a threaded exterior wall, a first end having a second mounting rod shaped to receive a distal end of the first biasing element 274 thereon, wherein the first plug 284 is rotatably received in the first access port and can be adjusted to increase or decrease a biasing force of the first biasing element.

The threshold pressure differential between the second hydrogen chamber 228 and the second oxygen chamber 244 due to excess pressure in the second oxygen chamber 244 causes the second piston to overcome the first biasing element and move toward a region of lesser pressure in the second hydrogen chamber 228 to remove the third valve pin from the oxygen vent valve seat to release oxygen through the oxygen vent port.

The third piston 256 extends between the third hydrogen cylinder and the third oxygen cylinder 248 and includes a fourth valve pin 276 seated in a hydrogen vent valve seat 278 in the third hydrogen cylinder 230 and a third mounting element 290 opposite the fourth valve pin 276, in the third oxygen cylinder 248. A second biasing element 280 in the third oxygen chamber 250 biases the fourth valve pin 276 into the hydrogen vent valve seat. Referring again to FIG. 25, a second access port in the third oxygen chamber 250 has a second plug (also referred to as a second insert) 292 disposed therein (e.g., threadedly), which has a mounting feature, e.g., a fourth mounting element 294 thereon for engaging the second biasing element 280. As such, the third and fourth mounting elements 290, 294 are used to position the second biasing element 280 in the third oxygen chamber 250. As is previously described for the first embodiment of the regulator 12, this second plug can optionally have a threaded end, which engages the inner surface of the second access port and can be used to adjust the tension on the second biasing element and thus adjust a threshold pressure differential between the third hydrogen chamber and the third oxygen chamber 250. That is, the second plug (or second insert) 292 has a threaded exterior wall, a first end having a fourth mounting rod shaped to receive a distal end of the second biasing element 280 thereon, wherein the second plug 292 is rotatably received in the second access port and can be adjusted to increase or decrease a biasing force of the second biasing element 280.

The threshold pressure differential between the third hydrogen chamber and the third oxygen chamber due to excess pressure in the third hydrogen chamber causes the third piston to overcome the second biasing element and move toward a region of lesser pressure in the third oxygen chamber to remove the fourth valve pin from the hydrogen vent valve seat to release hydrogen through the hydrogen vent port.

Figure 26:
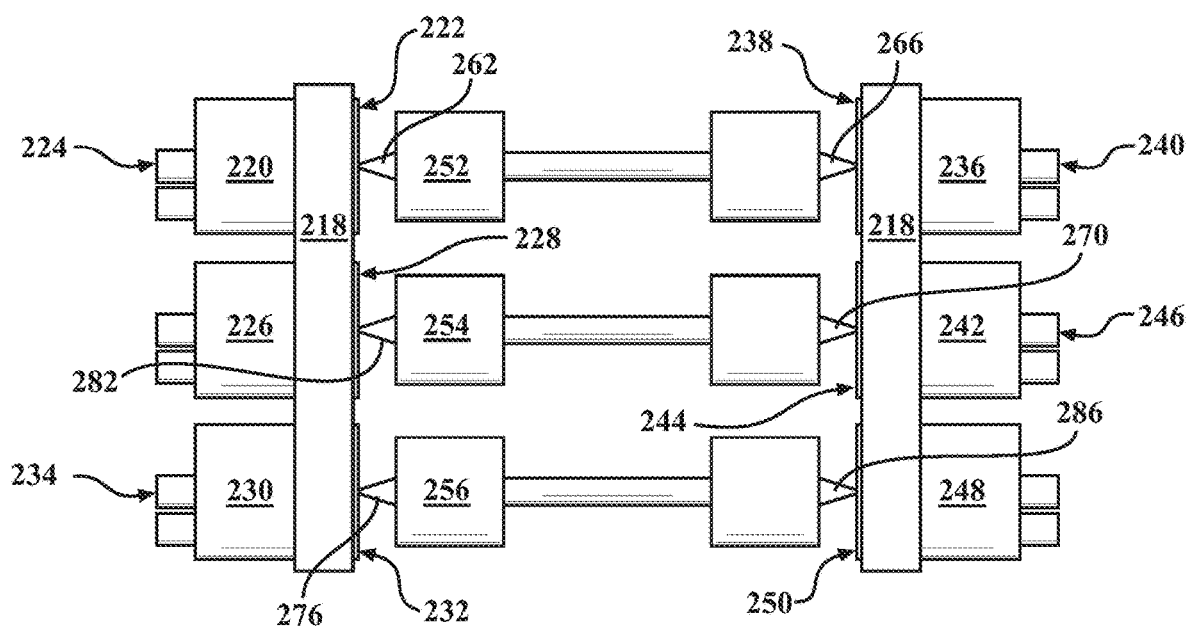
FIG. 26 is a partially exploded perspective side view of the housing, cylinders, and pistons of the passive dual modulating regulator with relative differential venting of FIG. 19.
Figure 27:
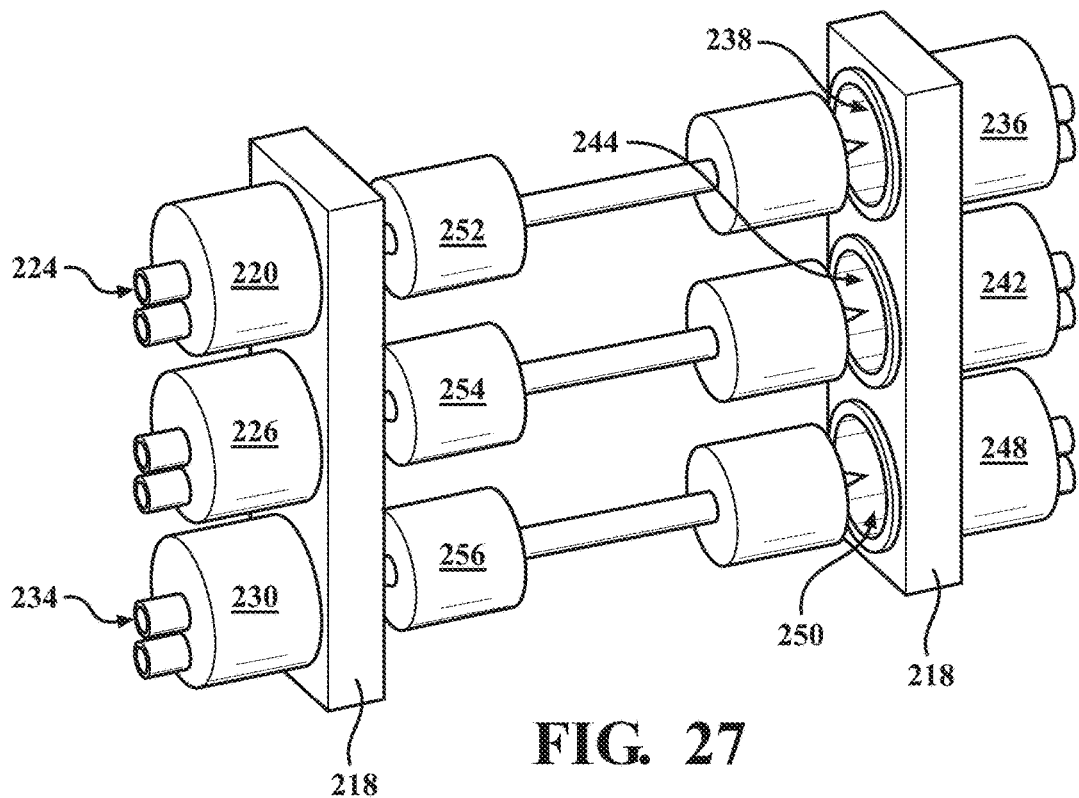
FIG. 27 is a perspective side view of the passive dual modulating regulator with relative differential venting of FIG. 26.

FIG. 26 is a partially exploded perspective side view of the housing, cylinders, and pistons of the regulator 212 with relative differential venting of FIG. 19. FIG. 27 is a perspective side view of the regulator 212 with relative differential venting of FIG. 26. It should be appreciated that the order of the piston assemblies can vary. That is, the first, second, and third pistons can be arranged in a different order and the input of hydrogen and oxygen can be in different positions on the regulator 212. For example, FIGS. 19-29 show the output assembly with the first piston located at the first end of the regulator 212 and the hydrogen vent assembly with the third piston assembly at the second end of the regulator 212, as an example this order can be reversed.

Figure 30:
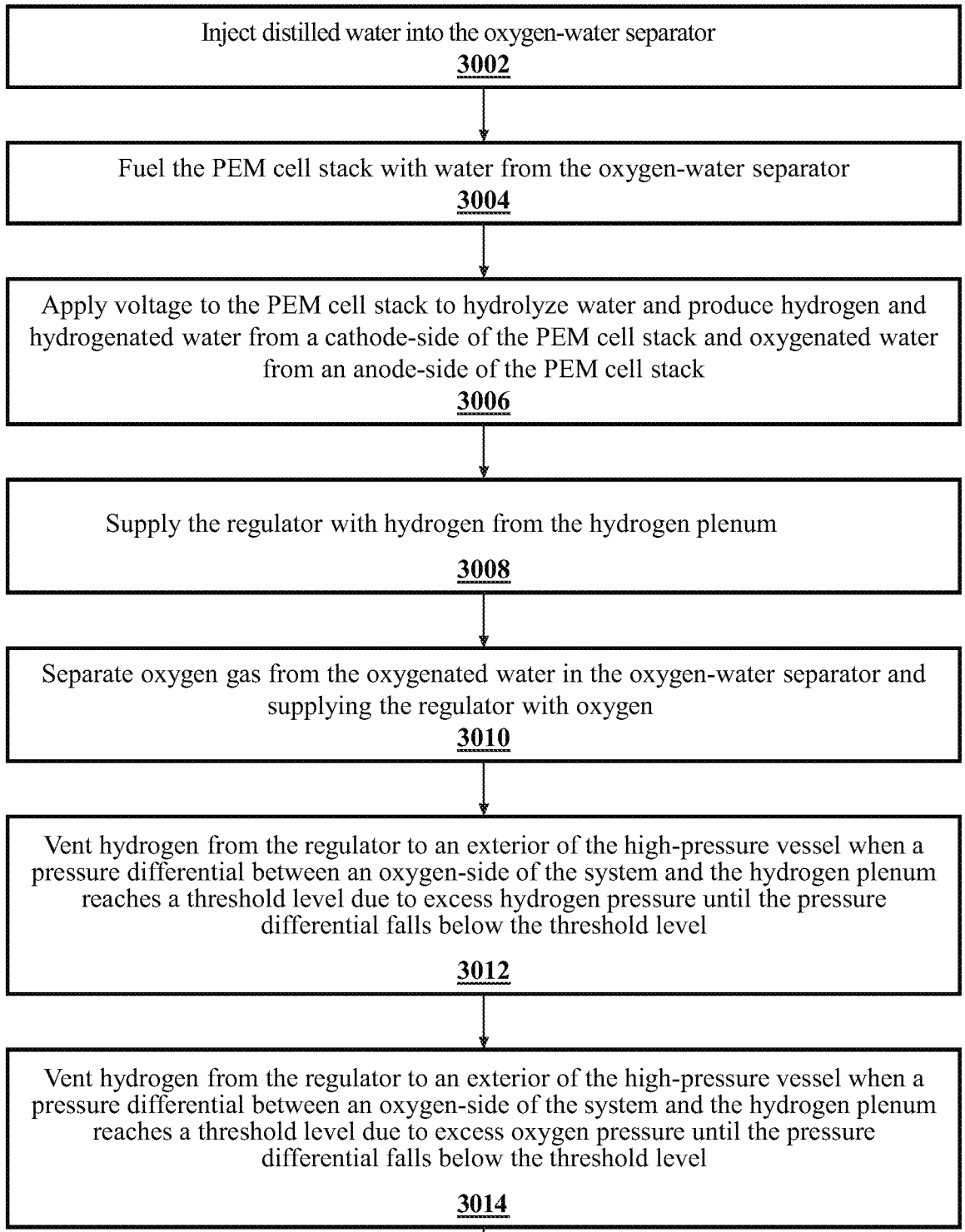
FIGS. 30A-30B illustrate a flow chart detailing an embodiment of a method of generating hydrogen and oxygen with a contained hydrogen generation system.

In some embodiments, the regulator further is fixedly disposed in an outer encasement. Typically, the oxygen vent port and the hydrogen vent port are in fluid communication with a local atmosphere, and the hydrogen outlet port and the oxygen outlet port are in fluid communication with an exterior hydrogen storage vessel and an exterior oxygen storage vessel, respectively. To this end, the regulator can be included on the interior of a high pressure-containment vessel or on the exterior of a high-pressure containment vessel. Further, just like described above in the context of the first embodiment of the regulator, in one embodiment, the first hydrogen cylinder, second hydrogen cylinder, third hydrogen cylinder, first oxygen cylinder, second oxygen cylinder, and third oxygen cylinder can be interchangeable. In some embodiments, the first hydrogen cylinder, second hydrogen cylinder, third hydrogen cylinder can be included in a single component. Likewise, in some embodiments, the first oxygen cylinder, second oxygen cylinder, and third oxygen cylinder can be included in a single component. Further, the ports allowing fluid movement in and out of the chambers can be common or can vary. These features provide for efficient fabrication and assembly of this embodiment of the regulator. An oxygen and hydrogen stable lubricant as well as various seal configurations can be used at the interface between the piston ends and the interior surfaces of the cylinders. Referring now to FIG. 30, an embodiment of a method of generating hydrogen and oxygen at elevated pressures with the hydrogen generation system 10 is disclosed. The system 10 is just as described above and includes the high-pressure containment vessel 20 defining the hydrogen plenum 42 with the PEM cell stack 14, the oxygen-water separator 16, and the passive dual modulating regulator with relative differential venting disposed therein. The method of FIG. 30 may employ various embodiments/designs of the passive dual modulating regulator with relative differential, e.g., embodiments of the regulator with a diaphragm as described herein, embodiments with piston valves described herein, embodiments utilizing electronic valves as described herein, etc. In fact, the unless specified, the methods described herein, e.g. in can employ any embodiment of the regulator that (1) vents hydrogen to an exterior of a high-pressure containment vessel of a contained hydrogen generating system when a pressure differential between an oxygen-side of the system and a hydrogen plenum reaches a threshold level due to excess hydrogen pressure until the pressure differential falls below the threshold level; (2) vents oxygen to an exterior of the high-pressure containment vessel when a pressure differential between the oxygen-side of the system and the hydrogen plenum reaches a threshold level due to excess oxygen pressure until the pressure differential falls below the threshold level; and (3) regulates a hydrogen discharge rate and an oxygen discharge rate to prevent pressure imbalances between an oxygen-side of the hydrogen generation system and the hydrogen plenum to avoid rupture of PEM cells within a PEM cell stack.

In many embodiments, the system 10, comprises the components described above with the 212. That is, the system includes the high-pressure containment vessel that at least partially defines a hydrogen plenum, one or more proton-exchange membrane (PEM) cells disposed in the hydrogen plenum, an oxygen-water separator disposed in the hydrogen plenum, and the passive dual modulating regulator, regulator 212.

The first piston valve comprises a first piston slidably engaged with, and extending between, a first hydrogen chamber and a first oxygen chamber, wherein a pressure differential between the first hydrogen chamber and the first oxygen chamber causes the first piston to move towards a chamber of lesser pressure, such that the first piston restricts and then seals a hydrogen outlet port or an oxygen outlet port to equalize pressure between the first hydrogen chamber and the first oxygen chamber. The second piston valve comprises a second piston slidably engaged with, and extending between, a second hydrogen chamber and a second oxygen chamber, wherein a threshold pressure differential between the second hydrogen chamber and the second oxygen chamber due to excess pressure in the second oxygen chamber causes the second piston to overcome a first biasing element and release oxygen through an oxygen vent port. The third valve comprising a third piston slidably engaged with, and extending between, a third hydrogen chamber and a third oxygen chamber, wherein a threshold pressure differential between the third hydrogen chamber and the third oxygen chamber causes the third piston to overcome a second biasing element and move toward a region of lesser pressure in the third oxygen chamber and release hydrogen through a hydrogen vent port.

An exemplary method (3000) set forth in FIG. 30 includes the steps of: injecting distilled water into the oxygen-water separator 16 (3002); fueling the PEM cell stack 14 with water from the oxygen-water separator 16 (3004); applying voltage to the PEM cell stack 14 to hydrolyze water and produce hydrogen and hydrogenated water from a cathode-side of the PEM cell stack 14 and oxygenated water from an anode-side of the PEM cell stack 14 (3006); supplying the regulator 12 with hydrogen from the hydrogen plenum 42 (3008); separating oxygen gas from the oxygenated water in the oxygen-water separator 16 and supplying the regulator 12 with oxygen (3010); venting hydrogen from the regulator 12 to an exterior of the high-pressure containment vessel 20 when a pressure differential between an oxygen-side of the system 10 and the hydrogen plenum 42 reaches a threshold level due to excess hydrogen pressure until the pressure differential falls below the threshold level (3012); venting oxygen from the regulator 12 to an exterior of the high-pressure containment vessel 20 when a pressure differential between the oxygen-side of the system 10 and the hydrogen plenum 42 reaches a threshold level due to excess oxygen pressure until the pressure differential falls below the threshold level (3014); regulating a hydrogen discharge rate and an oxygen discharge rate to prevent pressure imbalances between an oxygen-side of the system 10 and the hydrogen plenum 42 to avoid rupture of PEM cells within the PEM cell stack 14 (3016); discharging hydrogen from the regulator 12 to the exterior hydrogen storage vessel 28 (3018); and discharging oxygen from the regulator 12 to the exterior oxygen storage vessel 26 (3020).

Some embodiments of the method further comprise the step of using oxygen from the exterior oxygen storage vessel 26 to power the water booster 32 and inject deionized water into the oxygen-water separator 16. The water booster 32 converts potential energy stored in the oxygen produced by the system 10 and stored in the exterior oxygen storage vessel 26 into mechanical energy to power injection of water into the oxygen-water separator 16. Further, some embodiments of the method further comprise the step of using oxygen from the exterior oxygen storage vessel 26 to power the hydrogen gas booster 30 to supply a higher-pressure secondary storage tank with hydrogen from the exterior hydrogen storage vessel 28. The hydrogen gas booster 30 converts potential energy stored in the oxygen produced by the system 10 and stored in the exterior oxygen storage vessel 26 into mechanical energy to move hydrogen stored in the exterior hydrogen storage vessel 28 into the secondary storage tank such a hydrogen tank in a vehicle.

Some embodiments of the method include the step of accumulating hydrogenated water in the water collection reservoir 68 comprising a portion of the hydrogen plenum 42 proximal a floor of the high-pressure containment vessel 20 to cool the PEM cell stack 14 to remove excess heat generated during power generation to prevent short circuit currents between PEM cells in the PEM stack. The hydrogenated water can then be removed from the collection reservoir when water accumulated in the water collection reservoir 68 exceeds a certain level. Once removed, the hydrogenated water can be reclaimed in the exterior water supply tank 24 that is used to supply deionized water to the oxygen-water separator 16. Once in the exterior water supply tank 24, the dehydrogenator 62 can be used to percolate air into the exterior water supply tank 24 to remove the hydrogen present.

In some embodiments, hydrogen from the exterior hydrogen storage vessel 28 can be used to supply a methanol reactor that reacts carbon dioxide from air and the hydrogen generated by the system 10 in the presence of a catalyst to produce methanol. In these embodiments, the methanol reactor can be at least partially powered by at least one of the oxygen from the exterior oxygen storage vessel 26; hydrogen from the exterior hydrogen storage vessel 28; and solar energy.

Figure 32A:
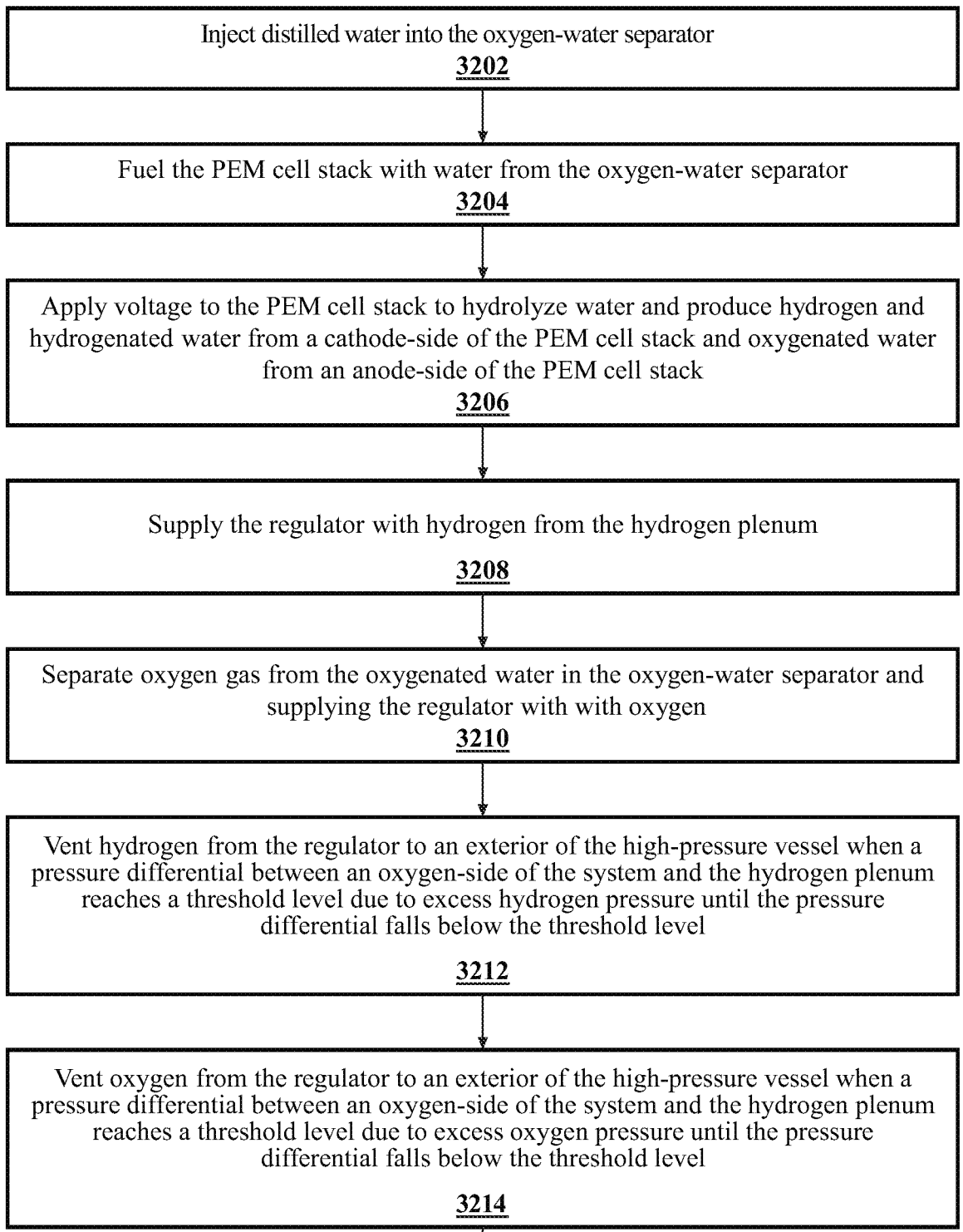

Referring now to FIG. 32, another embodiment of a method of generating hydrogen and oxygen at elevated pressures with the system 10 is disclosed with the system 10 described above. The method (3200) includes the steps of: injecting distilled water into the oxygen-water separator 16 (3202); fueling the PEM cell stack 14 with water from the oxygen-water separator 16 (3204); applying voltage to the PEM cell stack 14 to hydrolyze water and produce hydrogen and hydrogenated water from a cathode-side of the PEM cell stack 14 and oxygenated water from an anode-side of the PEM cell stack 14 (3206); supplying the regulator 12 with hydrogen from the hydrogen plenum 42 (3208); separating oxygen gas from the oxygenated water in the oxygen-water separator 16 and supplying the regulator 12 with oxygen (3210); venting hydrogen from the regulator 12 to an exterior of the high-pressure containment vessel 20 when a pressure differential between an oxygen-side of the system 10 and the hydrogen plenum 42 reaches a threshold level due to excess hydrogen pressure until the pressure differential falls below the threshold level (3212); venting oxygen from the regulator 12 to an exterior of the high-pressure containment vessel 20 when a pressure differential between the oxygen-side of the system 10 and the hydrogen plenum 42 reaches a threshold level due to excess oxygen pressure until the pressure differential falls below the threshold level (3214); regulating a hydrogen discharge rate and an oxygen discharge rate to prevent pressure imbalances between an oxygen-side of the system 10 and the hydrogen plenum 42 to avoid rupture of PEM cells within the PEM cell stack 14 (3216); discharging hydrogen from the regulator 12 to the exterior hydrogen storage vessel 28 (2118); discharging oxygen from the regulator 12 to an exterior oxygen storage vessel 26 (3220); using oxygen from the exterior oxygen storage vessel 26 to power the water booster 32 to inject deionized water into the oxygen-water separator 16, wherein the water booster 32 converts potential energy stored in the oxygen produced by the system 10 and stored in the exterior oxygen storage vessel 26 into mechanical energy to inject water into the oxygen-water separator 16 (3222); and using oxygen from the exterior oxygen storage vessel 26 to power a hydrogen gas booster 30 to supply a higher-pressure secondary storage tank such as a vehicle hydrogen tank with hydrogen from the exterior hydrogen storage vessel 28, wherein the gas hydrogen booster converts potential energy stored in the oxygen produced by the system 10 and stored in the exterior oxygen storage vessel 26 into mechanical energy to move hydrogen stored in the exterior hydrogen storage vessel 28 into the secondary storage tank (3224).

Referring now to FIG. 33, another embodiment of a method of generating hydrogen and oxygen at elevated pressures with the system 10 is disclosed with the system 10 described above. The method (3300) includes the steps of: injecting distilled water into the oxygen-water separator 16 (3302); fueling the PEM cell stack 14 with water from the oxygen-water separator 16 (3304); applying voltage to the PEM cell stack 14 to hydrolyze water and produce hydrogen and hydrogenated water from a cathode-side of the PEM cell stack 14 and oxygenated water from an anode-side of the PEM cell stack 14 (3306); supplying the regulator 12 with hydrogen from the hydrogen plenum 42 (3308); separating oxygen gas from the oxygenated water in the oxygen-water separator 16 and supplying the regulator 12 with oxygen (3310); venting hydrogen from the regulator 12 to an exterior of the high-pressure containment vessel 20 when a pressure differential between an oxygen-side of the system 10 and the hydrogen plenum 42 reaches a threshold level due to excess hydrogen pressure until the pressure differential falls below the threshold level (3312); venting oxygen from the regulator 12 to an exterior of the high-pressure containment vessel 20 when a pressure differential between the oxygen-side of the system 10 and the hydrogen plenum 42 reaches a threshold level due to excess oxygen pressure until the pressure differential falls below the threshold level (3314); regulating a hydrogen discharge rate and an oxygen discharge rate to prevent pressure imbalances between an oxygen-side of the system 10 and the hydrogen plenum 42 to avoid rupture of PEM cells within the PEM cell stack 14 (3316); discharging hydrogen from the regulator 12 to an exterior hydrogen storage vessel 28 (3318); discharging oxygen from the regulator 12 to the exterior oxygen storage vessel 26 (3320); using hydrogen from the exterior hydrogen storage vessel 28 to supply a methanol reactor that reacts carbon dioxide from air and the hydrogen in the presence of a catalyst to produce methanol (3322); and powering the methanol reactor with at least one of oxygen from the exterior oxygen storage vessel 26, hydrogen from the exterior hydrogen storage vessel 28, and solar energy (3324).

In some embodiments, the method (3300) further comprises the step using the dryer described above to dry an output stream comprising a mixture of methanol and water with comprising a plurality of columns and a plurality of valves, each of the plurality of columns defining an internal cavity including a heat exchanger and micro-sieves. This step includes the sub-steps of: drying the output stream with one of the plurality of columns to dehydrate the output stream; and venting the one column having wet micro sieves and circulating the dehydrated output stream through the heat exchanger to heat the heat exchanger and reduce a temperature of the dehydrated output stream to a temperature below the boing point of methanol. In other words, the output stream from the methanol reactor fed into a first column with dry micro-sieves. When that first column is saturated, the output stream is diverted to a second column with dry micro sieves, the dehydrated output stream is diverted into the heat exchanger in the saturated column which is vented, which evaporates the water from and dehydrates the column for further use. These steps can progress in a pattern so on and so forth allowing for the production of dry methanol at a lower temperature to facilitate immediate packaging without a step of cooling since heat is pulled from the dehydrated feed stream as it is used to dehydrate the previously used and now saturated column.

The above description is presented for illustrative purposes and should not be interpreted as an exhaustive description of all embodiments of the disclosure or to limit the scope of any claims to the specific elements illustrated or described in connection with this embodiment. Any reference to elements in the singular, for example, using the articles "a," "an," "the," or "said," is not to be construed as limiting the element to the singular. Also, the terminologies "upper," "lower", "above", "below", etc. are intended for clarity of information while describing the embodiments as shown in the figures and are not to be construed as limiting the relationships between the geometric features of this disclosure.

The invention claimed is:

1. A passive dual modulating regulator with relative differential venting ("regulator") having a first end and a second end, the regulator comprising:
 a first housing section and a second housing section that cooperate to define a first internal cavity having a first valve assembly therein, a second internal cavity having a second valve assembly therein, and a third internal cavity having a third valve assembly therein, wherein:
 the first housing section defines a hydrogen gas inlet in fluid communication with a hydrogen fluid path, a hydrogen outlet port, and a hydrogen vent port; and
 the second housing section defines an oxygen gas inlet in fluid communication with an oxygen fluid path, an oxygen outlet port, and an oxygen vent port;
 a flexible diaphragm having a first side and a second side and clamped between the first housing section and the second housing section along a periphery thereof, wherein:
 a first hydrogen chamber is positioned on the first side of the flexible diaphragm and a first oxygen chamber is positioned on the second side of the flexible diaphragm within the first internal cavity; and
 the first valve assembly extends through the flexible diaphragm and includes a first valve pin in alignment with a first valve seat in the first housing section and includes a second valve pin in alignment with a second valve seat in the second housing section, wherein a pressure differential between the first hydrogen chamber and the first oxygen chamber causes the flexible diaphragm to deflect toward a region of lesser pressure, such that the first valve assembly restricts and then seals the hydrogen outlet port for the first hydrogen chamber or the oxygen outlet port for the first oxygen chamber to equalize pressure within the first hydrogen chamber and the first oxygen chamber;

a second hydrogen chamber in fluid communication with the first hydrogen chamber is positioned on the first side of the flexible diaphragm and a second oxygen chamber in fluid communication with the first oxygen chamber is positioned on the second side of the flexible diaphragm;

the second valve assembly extends through the flexible diaphragm and includes a third valve pin seated in a third valve seat in second hydrogen chamber in alignment with a first biasing element in the second oxygen chamber biasing the third valve pin into the third valve seat, wherein a threshold pressure differential between the second hydrogen chamber and the second oxygen chamber due to excess pressure in the second hydrogen chamber causes the flexible diaphragm to overcome the first biasing element and deflect toward a region of lesser pressure in the second oxygen chamber to open the second valve assembly to release gas through the hydrogen vent port;

a third hydrogen chamber in fluid communication with the second hydrogen chamber is positioned on the first side of the flexible diaphragm and a third oxygen chamber in fluid communication with the second oxygen chamber is positioned on the second side of the flexible diaphragm; and the third valve assembly extends through the flexible diaphragm and includes a fourth valve pin seated in a fourth valve seat in the third oxygen chamber in alignment with a second biasing element in the third hydrogen chamber biasing the fourth valve pin into the fourth valve seat, wherein a threshold pressure differential between the third hydrogen chamber and the third oxygen chamber due to excess pressure in the third oxygen chamber causes the flexible diaphragm to overcome the second biasing element and deflect toward a region of lesser pressure in the third hydrogen chamber to open the third valve assembly to release gas through the oxygen vent port.

2. The regulator of claim 1, wherein:
the hydrogen gas inlet is defined by the first housing section at the first end of the regulator;
the hydrogen vent port extends through the first housing section of the regulator;
the oxygen gas inlet is defined by the second housing section at the first end of the regulator; and
the oxygen vent port extends through the second housing section of the regulator.

3. The regulator of claim 1, wherein the hydrogen gas inlet, the oxygen gas inlet, the hydrogen outlet port, the oxygen outlet port, the hydrogen vent port, and the oxygen vent port have a common diameter and are defined by a threaded surface.

4. The regulator of claim 1, wherein the first housing section and the second housing section are chiral.

5. The regulator of claim 1, wherein the first valve assembly includes:
the first valve pin extending from a first valve base; and
the second valve pin extending from a second valve base,
wherein a first headless screw extends through the flexible diaphragm and to couple the first and the second valve bases; and
wherein the first valve assembly includes a first fender washer on the first side of the flexible diaphragm and a second fender washer on the second side of the flexible diaphragm.

6. The regulator of claim 1, wherein the second valve assembly includes:
the third valve pin extending from a third valve base; and
a first mounting rod opposite the third valve pin;
wherein a second headless screw extends through the flexible diaphragm to couple the third valve pin and the first mounting rod; and
wherein the second valve assembly includes a third fender washer on the first side of the flexible diaphragm and a fourth fender washer on the second side of the flexible diaphragm.

7. The regulator of claim 6, wherein:
the second housing section includes a first access port opposite the hydrogen vent port in the first housing section and the first access port is defined by a threaded surface and has a common diameter with the hydrogen vent port.

8. The regulator of claim 7, wherein a first insert has a threaded exterior wall, a first end having a second mounting rod shaped to receive a distal end of the first biasing element thereon, wherein the first insert is rotatably received in the first access port and can be adjusted to increase or decrease a biasing force of the first biasing element.

9. The regulator of claim 1, wherein the third valve assembly includes:
the fourth valve pin extending from a fourth valve base; and
a third mounting rod opposite the fourth valve pin;
wherein a second headless screw extends through the flexible diaphragm to couple the fourth valve pin and the third mounting rod; and
the second valve assembly includes a fifth fender washer on a first side of the flexible diaphragm and a sixth fender washer on a second side of the flexible diaphragm.

10. The regulator of claim 9, wherein the first housing section includes a second access port opposite the oxygen vent port in the second housing section and the second access port is defined by a threaded surface and has a common diameter with the oxygen vent port.

11. The regulator of claim 10, wherein a second insert has a threaded exterior wall, a first end having a fourth mounting rod shaped to receive a distal end of the second biasing element thereon, wherein the second insert is rotatably received in the second access port and can be adjusted to increase or decrease a biasing force of the second biasing element.

12. The regulator of claim 1, wherein the first, second, and third valve assembly includes:
a first headless screw extending through a first central aperture for attachment to a first and a second valve base;
a second headless screw extending through a second central aperture for attachment to a third valve base and a first mounting rod; and
a third headless screw extending through a third central aperture for attachment to a third mounting rod and a fourth valve base.

13. The regulator of claim 1, wherein the flexible diaphragm comprises a sulfonated tetrafluoroethylene-based fluoropolymer-copolymer.

14. The regulator of claim 1, wherein:
when a pressure differential between the second hydrogen chamber and the second oxygen chamber exceeds 15 psi, the first biasing element is overcome, and the second valve assembly opens to release gas through the hydrogen vent port; and/or
when a pressure differential between the third hydrogen chamber and the third oxygen chamber exceeds 15 psi, then the second biasing element is overcome, and the third valve assembly opens to release gas through the oxygen vent port.

* * * * *